(12) United States Patent
Broadworth et al.

(10) Patent No.: US 10,693,773 B2
(45) Date of Patent: *Jun. 23, 2020

(54) METHOD FOR ROUTING IN A CENTRAL CONFERENCING ROUTING SERVER

(71) Applicant: Level 3 Communications, LLC, Broomfield, CO (US)

(72) Inventors: Andrew J. Broadworth, Thornton, CO (US); Darren J. Behmlander, White Lake, MI (US); Adam C. Uzelac, Rochester, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,966

(22) Filed: Jul. 29, 2019

(65) Prior Publication Data
US 2019/0356582 A1    Nov. 21, 2019

Related U.S. Application Data

(60) Continuation of application No. 16/105,871, filed on Aug. 20, 2018, now Pat. No. 10,367,727, which is a
(Continued)

(51) Int. Cl.
*H04L 12/721* (2013.01)
*H04L 12/18* (2006.01)
(Continued)

(52) U.S. Cl.
CPC .............. *H04L 45/44* (2013.01); *H04L 12/18* (2013.01); *H04L 12/1813* (2013.01);
(Continued)

(58) Field of Classification Search
CPC ..... H04L 45/44; H04L 12/18; H04L 12/1813; H04L 12/1818; H04L 41/0668;
(Continued)

(56) References Cited

U.S. PATENT DOCUMENTS 5,280,583 A   1/1994   Nakayama et al.
5,623,603 A   4/1997   Jiang et al.
(Continued)

FOREIGN PATENT DOCUMENTS

EP          2053869 A1    4/2009
WO    WO-2007040931 A1   4/2007

OTHER PUBLICATIONS

Canadian Examination Report, dated Oct. 25, 2018, Application No. 2,859,816, filed Dec. 20, 2012; 4 pgs.
(Continued)

*Primary Examiner* — Ian N Moore
*Assistant Examiner* — Latresa A McCallum

(57) ABSTRACT

Aspects of the present disclosure involve systems, methods, computer program products, and the like, for collaboration conferencing with multiple participants over a communications network, and more specifically for a conferencing routing service for managing and routing collaboration participants. A collaboration conferencing routing server may provide configurability in routing a collaboration conference to a conference bridge based on any number of criteria and information about the requester and the communications network on which the conference occurs.

16 Claims, 12 Drawing Sheets

Related U.S. Application Data continuation of application No. 15/632,776, filed on Jun. 26, 2017, now Pat. No. 10,057,161, which is a division of application No. 14/930,644, filed on Nov. 2, 2015, now Pat. No. 9,692,798, which is a continuation of application No. 13/708,659, filed on Dec. 7, 2012, now Pat. No. 9,178,918.

(60) Provisional application No. 61/584,122, filed on Jan. 6, 2012, provisional application No. 61/584,115, filed on Jan. 6, 2012, provisional application No. 61/578,807, filed on Dec. 21, 2011, provisional application No. 61/578,803, filed on Dec. 21, 2011, provisional application No. 61/578,798, filed on Dec. 21, 2011, provisional application No. 61/578,794, filed on Dec. 21, 2011, provisional application No. 61/578,810, filed on Dec. 21, 2011.

(51) Int. Cl.
| | |
|---|---|
| H04L 12/801 | (2013.01) |
| H04M 3/56 | (2006.01) |
| H04L 29/06 | (2006.01) |
| H04L 29/08 | (2006.01) |
| H04L 12/24 | (2006.01) |
| H04L 29/12 | (2006.01) |
| H04L 12/26 | (2006.01) |

(52) U.S. Cl.
CPC ...... *H04L 12/1818* (2013.01); *H04L 41/0668* (2013.01); *H04L 43/0876* (2013.01); *H04L 47/15* (2013.01); *H04L 61/2007* (2013.01); *H04L 65/1006* (2013.01); *H04L 65/1069* (2013.01); *H04L 65/403* (2013.01); *H04L 65/80* (2013.01); *H04L 67/18* (2013.01); *H04M 3/56* (2013.01)

(58) Field of Classification Search
CPC . H04L 43/0876; H04L 47/15; H04L 61/2007; H04L 65/1006; H04L 65/1069; H04L 65/403; H04L 65/80; H04L 67/18; H04M 3/56

See application file for complete search history.

(56) References Cited

U.S. PATENT DOCUMENTS

| | | | |
|---|---|---|---|
| 5,825,858 A | 10/1998 | Shaffer et al. | |
| 5,828,743 A | 10/1998 | Pinnell | |
| 5,978,463 A | 11/1999 | Jurkevics | |
| 6,411,605 B1 | 6/2002 | Vance et al. | |
| 6,553,413 B1 | 4/2003 | Leighton et al. | |
| 6,564,261 B1 | 5/2003 | Gudjonsson et al. | |
| 6,646,997 B1 | 11/2003 | Baxley et al. | |
| 6,657,975 B1 | 12/2003 | Baxley et al. | |
| 6,671,717 B1 | 12/2003 | Shaffer | |
| 6,782,413 B1 | 8/2004 | Loveland | |
| 6,879,565 B2 | 4/2005 | Baxley et al. | |
| 6,885,740 B2 | 4/2005 | Ernstrom et al. | |
| 6,898,273 B2 | 5/2005 | Ernstrom et al. | |
| 6,961,416 B1 | 11/2005 | Summers et al. | |
| 7,054,933 B2 | 5/2006 | Baxley et al. | |
| 7,394,896 B2 | 7/2008 | Norton | |
| 7,460,493 B1 | 12/2008 | Dhanoa et al. | |
| 7,778,206 B2 | 8/2010 | Shaffer et al. | |
| 7,889,660 B2 | 2/2011 | Bugenhagen | |
| 8,060,563 B2 | 11/2011 | Whynot et al. | |
| 8,068,425 B2 | 11/2011 | Bugenhagen | |
| 8,189,468 B2 | 5/2012 | Bugenhagen | |
| 8,194,643 B2 | 6/2012 | Bugenhagen | |
| 8,229,096 B1 | 7/2012 | Marquis et al. | |
| 8,289,965 B2 | 10/2012 | Bugenhagen et al. | |
| 8,340,083 B2 | 12/2012 | Bugenhagen et al. | |
| 8,364,133 B1 | 1/2013 | Lucey et al. | |
| 8,428,634 B2 | 4/2013 | Schwagmann et al. | |
| 8,467,354 B1 | 6/2013 | Jerkunica | |
| 8,665,758 B1 | 3/2014 | Mateer | |
| 8,666,056 B2 | 3/2014 | Makagon et al. | |
| 8,737,596 B2 | 5/2014 | Kelley et al. | |
| 8,774,383 B1 | 7/2014 | Marquis et al. | |
| 8,798,251 B2 | 8/2014 | Rajagopalan et al. | |
| 2001/0002927 A1 | 6/2001 | Detampel, Jr. et al. | |
| 2002/0075304 A1 | 6/2002 | Thompson et al. | |
| 2002/0076025 A1 | 6/2002 | Liversidge et al. | |
| 2002/0172341 A1 | 11/2002 | Wellner et al. | |
| 2003/0023672 A1 | 1/2003 | Vaysman | |
| 2003/0156697 A1 | 8/2003 | Svercek | |
| 2003/0217174 A1 | 11/2003 | Dorenbosch et al. | |
| 2004/0047460 A1 | 3/2004 | Adams et al. | |
| 2004/0170266 A1 | 9/2004 | Adams et al. | |
| 2004/0246332 A1 | 12/2004 | Crouch | |
| 2005/0034079 A1 | 2/2005 | Gunasekar | |
| 2005/0058125 A1 | 3/2005 | Mutikainen et al. | |
| 2005/0213517 A1 | 9/2005 | Rodman et al. | |
| 2007/0217589 A1 | 9/2007 | Martin et al. | |
| 2007/0248022 A1 | 10/2007 | Kumar et al. | |
| 2007/0266077 A1 | 11/2007 | Wengrovitz | |
| 2008/0031437 A1 | 2/2008 | Rey | |
| 2008/0049753 A1 | 2/2008 | Heinze et al. | |
| 2008/0063173 A1 | 3/2008 | Sarkar et al. | |
| 2008/0112336 A1 | 5/2008 | Gray | |
| 2008/0159179 A1 | 7/2008 | Shaffer | |
| 2008/0218586 A1 | 9/2008 | Graham et al. | |
| 2008/0253549 A1 | 10/2008 | Loveland | |
| 2009/0019367 A1 | 1/2009 | Cavagnari et al. | |
| 2010/0124321 A1 | 5/2010 | Alexandrov et al. | |
| 2010/0165889 A1 | 7/2010 | Madabhushi et al. | |
| 2010/0169418 A1 | 7/2010 | Whynot et al. | |
| 2010/0275134 A1 | 10/2010 | Baker et al. | |
| 2012/0117153 A1* | 5/2012 | Gunasekar | H04N 7/152 709/204 |
| 2013/0162756 A1 | 6/2013 | Ellison et al. | |
| 2013/0163409 A1 | 6/2013 | Ellison et al. | |
| 2013/0163435 A1 | 6/2013 | Ellison et al. | |
| 2013/0163481 A1 | 6/2013 | Ellison et al. | |
| 2013/0173706 A1 | 7/2013 | Broadworth et al. | |
| 2013/0335513 A1 | 12/2013 | Broadworth et al. | |
| 2013/0336170 A1 | 12/2013 | Broadworth et al. | |
| 2016/0044068 A1 | 2/2016 | Ellison et al. | |
| 2016/0050078 A1 | 2/2016 | Ellison et al. | |
| 2016/0053997 A1 | 2/2016 | Broadworth et al. | |
| 2016/0057183 A1 | 2/2016 | Broadworth et al. | |
| 2016/0285726 A1 | 9/2016 | Ellison et al. | |
| 2017/0180431 A1 | 6/2017 | Ellison et al. | |
| 2017/0295092 A1 | 10/2017 | Broadworth et al. | |
| 2018/0213011 A1 | 7/2018 | Ellison et al. | |
| 2018/0359180 A1 | 12/2018 | Broadworth et al. | |
| 2019/0075144 A1 | 3/2019 | Broadworth et al. | |

OTHER PUBLICATIONS

Canadian Examination Report, dated Oct. 5, 2018, Application No. 2,860,509, filed Jan. 4, 2013; 3 pgs.
European Examination Report, dated Jul. 6, 2016, Application No. 12860103.6, filed Dec. 20, 2012;7 pgs.
European Examination Report, dated Jul. 7, 2016, Application No. 13733754.9, filed Jan. 4, 2013; 4 pgs.
European Examination Report, dated May 10, 2017, Application No. 12860103.6, filed Dec. 20, 2012; 10 pgs.
Extended European Search Report, dated May 18, 2015, Application No. 12860103.6, filed Dec. 20, 2012; 10 pgs.
Extended European Search Report, dated May 18, 2015, Application No. 13733754.9, filed Jan. 4, 2013; 10 pgs.
International Preliminary Report on Patentability, dated Jul. 8, 2014, Int'l Appl. No. PCT/US13/020244, Int'l Filing Date Jul. 8, 2014; 18 pgs.
International Preliminary Report on Patentability, dated Jun. 24, 2014, Int'l Appl. No. PCT/US12/071018, Int'l Filing Date Dec. 20, 2012; 8 pgs.

(56) References Cited

OTHER PUBLICATIONS

International Search Report, dated Apr. 23, 2013, Int'l Appl. No. PCT/US13/020244, Int'l Filing Date Jan. 4, 2013, 5 pgs.
International Search Report, dated Mar. 19, 2013, Int'l Appl. No. PCT/US12/071018, Int'l Filing Date Dec. 20, 2012; 3 pgs.
"Telecommunications and Internet Converged Services and Protocols for Advanced Networking (TISPAN)", Release 2;PSTN/ISDN simulation services: Conference (CONF); Protocol specification;13bTD300 WI03083 Discussion of 3PTY, ETSI Draft; European Telecommuniocations Standards Institute (ETSI), 650, Route des Lucioles; F-06921 Sophia-Antipolis; France; Mar. 20, 2007 , vol. zArchive, No. V0.0.3, pp. 1-20.
Written Opinion of the International Searching Authority, dated Apr. 23, 2013, Int'l Appl. No. PCT/US13/020244, Int'l Filing Date Jan. 4, 2013, 16 pgs.
Written Opinion of the International Searching Authority, dated Mar. 19, 2013, Int'l Appl. No. PCT/US12/071018, Int'l Filing Date Dec. 20, 2012, 5 pgs.
Colbert, Raymond O. et al., "Advanced Services: Changing How We Communicate", In: *Bell Labs Technical Journal* [online], [retrieved on Feb. 11, 2013 (Feb. 11, 2013)] Retrieved from the Internet <URL: http://www.herbsleb.org/web-pubs/pdfs/colbert-advanced-2001.pdf>, entire document Jun. 1, 2001 , pp. 211-228.

* cited by examiner

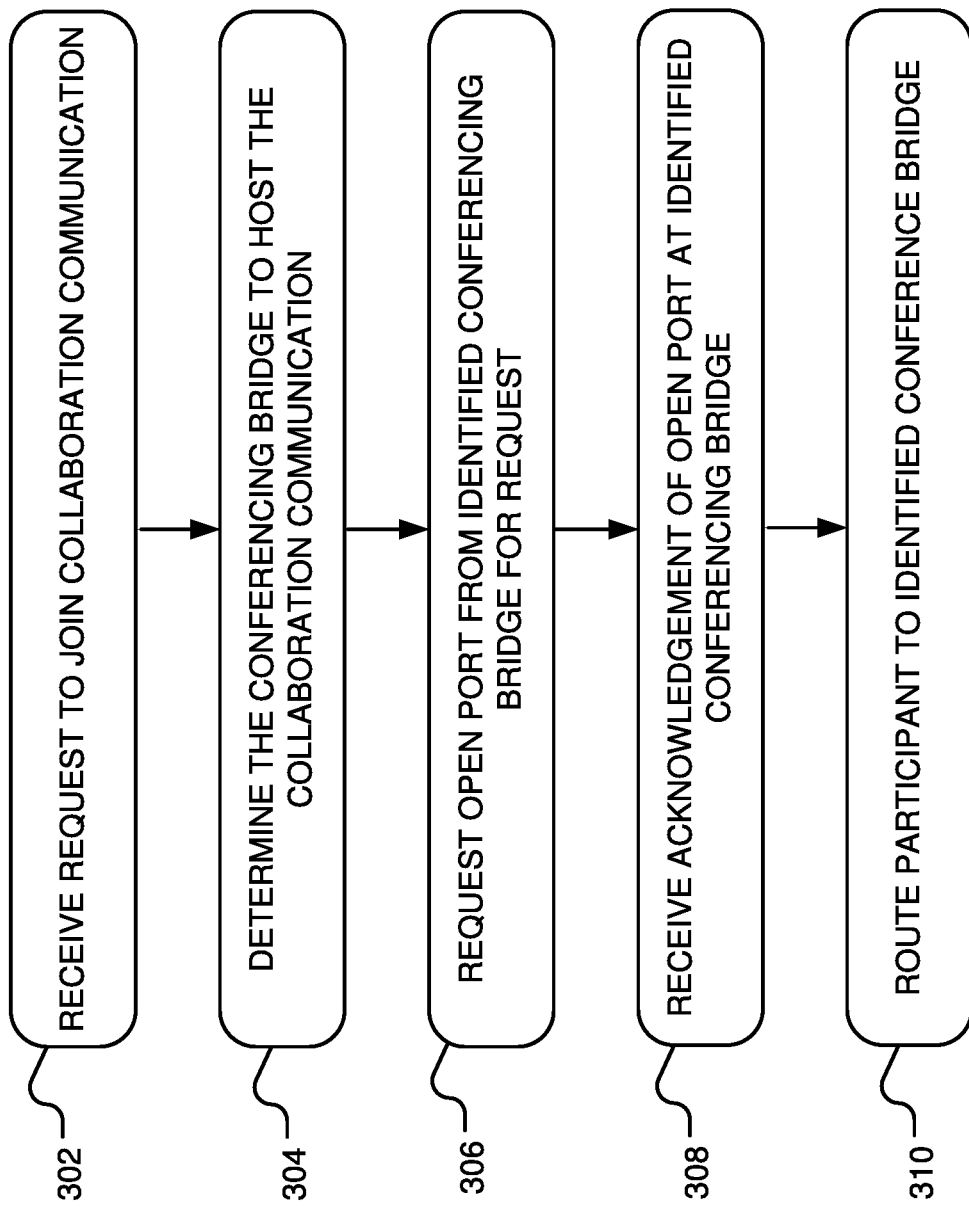

METHOD FOR ROUTING IN A CENTRAL CONFERENCING ROUTING SERVER

CROSS-REFERENCE TO RELATED APPLICATIONS

This application is a continuation of and claims the benefit of priority from U.S. patent application Ser. No. 16/105,871, entitled "METHOD FOR ROUTING IN A CENTRAL CONFERENCING ROUTING SERVER," filed Aug. 20, 2018, the entire contents of which are incorporated by reference herein for all purposes. Application Ser. No. 16/105,871 is a continuation of and claims the benefit of priority from U.S. patent application Ser. No. 15/632,776, entitled "METHOD FOR ROUTING IN A CENTRAL CONFERENCING ROUTING SERVER," filed Jun. 26, 2017, the entire contents of which are incorporated by reference herein for all purposes. Application Ser. No. 15/632,776 is a division of and claims the benefit of priority from U.S. patent application Ser. No. 14/930,644, entitled "METHOD FOR ROUTING IN A CENTRAL CONFERENCING ROUTING SERVER," filed Nov. 2, 2015, the entire contents of which are incorporated by reference herein for all purposes. Application Ser. No. 14/930,644 is a continuation of and claims the benefit of priority from U.S. patent application Ser. No. 13/708,659, entitled "METHOD FOR ROUTING IN A CENTRAL CONFERENCING ROUTING SERVER," filed Dec. 7, 2012, the entire contents of which are incorporated by reference herein for all purposes. Application Ser. No. 13/708,659 claims priority under 35 U.S.C. § 119(e) from U.S. Provisional Application No. 61/584,122, entitled "CENTRAL CONFERENCING ROUTING SERVICE," filed Jan. 6, 2012, and claims priority under 35 U.S.C. § 119(e) from U.S. Provisional Application No. 61/584,115, entitled, "CENTRAL CONFERENCING ROUTING SERVICE," filed Jan. 6, 2012, and claims priority under 35 U.S.C. § 119(e) from U.S. Provisional Application No. 61/578,803, entitled, "SIP-BASED VOIP COLLABORATION," filed Dec. 21, 2011, and claims priority under 35 U.S.C. § 119(e) from U.S. Provisional Application No. 61/578,810, entitled, "SIP-BASED VOIP COLLABORATION," filed Dec. 21, 2011, and claims priority under 35 U.S.C. § 119(e) from U.S. Provisional Application No. 61/578,798, entitled, "SIP-BASED VOIP COLLABORATION," filed Dec. 21, 2011, and claims priority under 35 U.S.C. § 119(e) from U.S. Provisional Application No. 61/578,794, entitled, "SIP-BASED VOIP COLLABORATION," filed Dec. 21, 2011, and claims priority under 35 U.S.C. § 119(e) from U.S. Provisional Application No. 61/578,807, entitled, "SIP-BASED VOIP COLLABORATION," filed Dec. 21, 2011, the entire contents are fully incorporated by reference herein for all purposes.

TECHNICAL FIELD

Aspects of the present disclosure generally relate to systems and methods that provide for collaboration conferencing with multiple participants using devices connected to a telecommunication network, including a Vol P network, and more specifically for a conferencing routing service for managing and routing collaboration participants.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from several users to several thousand users communicating on the same telephonic, video and/or data call.

Typically, conferencing communications require participants to the conference to place a telephonic call to a dedicated conferencing number. Some networks also require the participants enter a conference call code into the keypad of a telephonic device. The conferencing number and code are then utilized by the telecommunications network to connect that participant to a conference bridge device. In general, a conference bridge is a telecommunications device that hosts the participants of a conferencing communication such that the participants can participate in a conference call. Thus, the network typically receives the dialed number and conference code from each participant and connects the participant to the conference bridge. Once connected to the conference bridge, the participant may take part in the conference. To ensure that each of the participants of the conference may take part in the communication, each participant must connect to the same conference bridge. However, the routing of the participant to the conference bridge typically occurs without consideration of the routing of the other participants to the conference bridge by the network. Rather, each request from each participant may be routed to a conference bridge on an individual basis.

It is with these and other issues in mind, among others, that various aspects of the present disclosure were conceived and developed.

SUMMARY

One implementation of the present disclosure may take the form of a telecommunications network. The network comprises a plurality of collaboration conferencing routing servers comprising a master conferencing routing server executing a master control engine application and at least one slave conferencing routing server, wherein each of the plurality of collaboration conferencing routing servers comprises a database configured to store a state of at least one initiated collaboration conferences on the telecommunications network and a plurality of conference bridges configured to host a collaboration conference connected to the plurality of collaboration conferencing routing servers. In addition, the master control engine is configured to perform certain operations. Such operations include receiving a collaboration conference access request from a requester to initiate a collaboration conference, associating an identification number with the collaboration conference access request, the identification number associated with a customer of a telecommunications network selecting a hosting conference bridge from the plurality of conference bridges, the selection occurring in response to the collaboration conference access request and identification number and transmitting one or more conference state messages to the at least one slave conferencing routing server, wherein the one or more conference state messages include an active state of the at least one initiated collaboration conference and an indication of the selected conference bridge.

Another implementation of the present disclosure may take the form of method for routing one or more collaboration conference access requests. The method may include the operations of receiving a collaboration conference access request from a requester's telephonic device at a master conferencing routing server of a plurality of conferencing routing servers, wherein the a master conferencing routing server executes a master control engine application and associating an identification number with the collaboration conference access request, the identification number associated with a customer of a telecommunications network. In addition, the method may include selecting a hosting conference bridge from a plurality of conference bridges connected to the plurality of conferencing routing servers, the hosting conference bridge configured to host a collaboration conference, the selection occurring in response to the collaboration conference access request and identification number and transmitting one or more routing messages to the telecommunications network, wherein the one or more routing messages include an indication of the selected conference bridge.

BRIEF DESCRIPTION OF THE DRAWINGS

FIG. 3A is a flowchart of a method for the CCRS of the network 102 to receive a request from one or more participants to join a collaboration session and route the participants to the proper conference bridge

DETAILED DESCRIPTION

Aspects of the present disclosure involve systems, methods, computer program products, and the like, for collaboration conferencing with multiple participants over a communications network, and more specifically for a conferencing routing server for managing and routing collaboration participants. In one example, a central conferencing routing server (CCRS) may be implemented in the communications network to receive a request to join a collaboration conference from one or more of the participants and route the participants to a shared communication bridge that conducts the conference. Additionally, the CCRS may receive and maintain information about the communications network to intelligently route the collaboration conference to an appropriate bridge based on any number of criteria. For example, the CCRS may communicate with one or more conference bridges associated with the communications network and determine which conference bridge will host a collaboration conference request from a collaboration participant.

The CCRS may also determine which conference bridge will host a collaboration conference request based on other information. For example, the CCRS may maintain a database of information or preferences associated with the conference requester and attempt to select a conference bridge based on the requester's information. Such information may include, but are not limited to, a regional preference, the size of the collaboration request and certain collaboration features of the conference collaboration. In another example, the CCRS may receive performance information from a plurality of conference bridges able to conduct the collaboration conference and select a conference bridge in response to the performance information. Additionally, the CCRS may be configured to respond to a failure in one of the conference bridges to allow for repair to the network and/or account for split conferences that may occur due to the bridge failure. In general, the CCRS may provide configurability in routing a collaboration conference to a conference bridge based on any number of criteria and information about the requester and the communications network on which the conference occurs.

Figure 1:
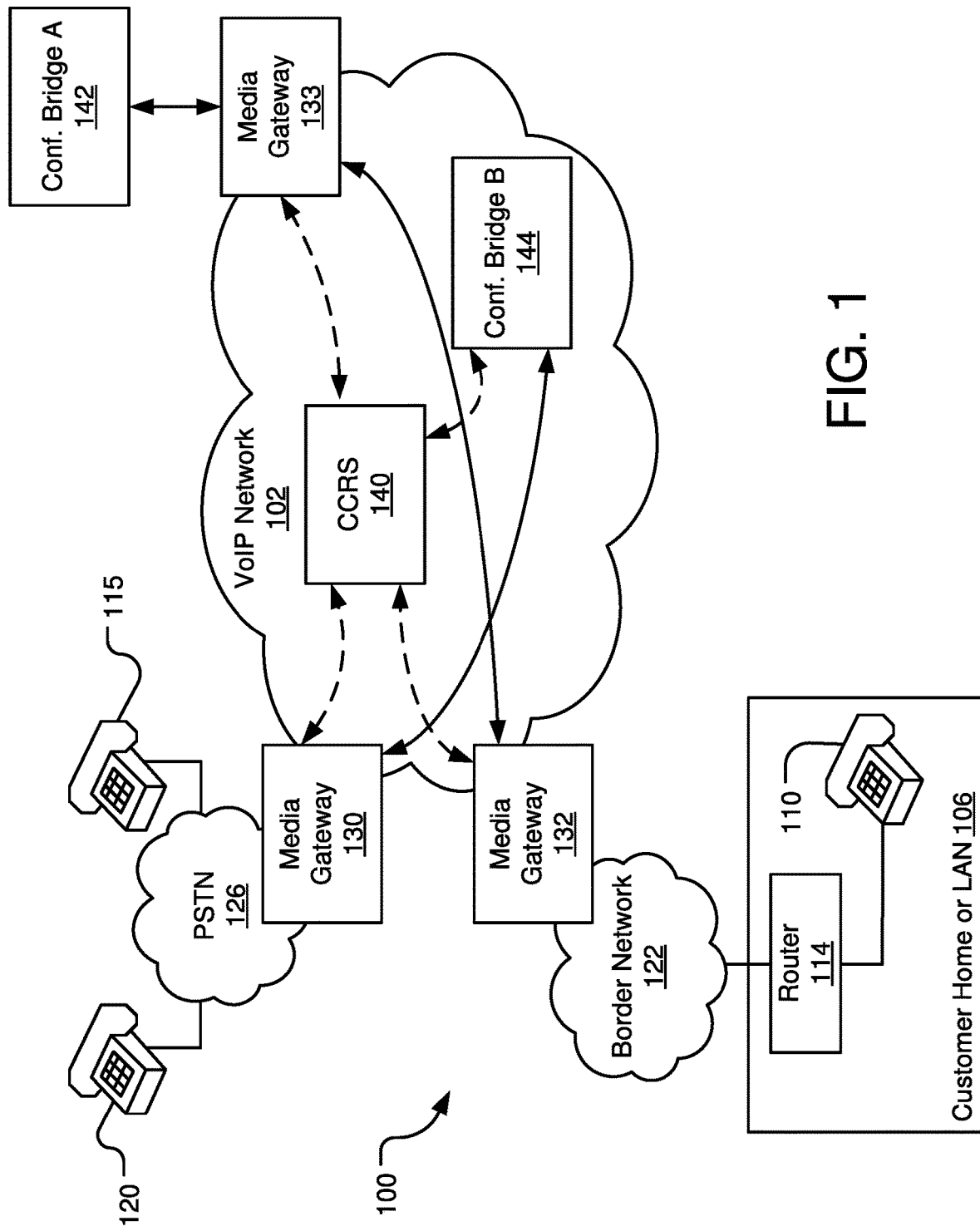
FIG. 1 schematic diagram illustrating an exemplary Voice over Internet Protocol (Vol P) operating environment, including a central conferencing routing server, in accordance with one embodiment.

FIG. 1 illustrates an exemplary operating environment 100 for hosting conference collaboration communications between multiple participants. The environment 100 provides for setting up communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that any communication network is envisioned as included in the operating environment 100. For example, network 102 may be a circuit switch communication network utilizing time division multiplexing (TDM) or plain old telephone service (POTS) switching. In general, the network 102 of FIG. 1 may be any communication network known or hereafter developed. However, for ease of understanding, a VoIP network embodiment is hereafter used to describe the communications network.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as telephonic devices 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates the communication devices 110, 115, 120 as telephonic devices, the communication devices may be any type of communication device, including personal computers, cellular phones and the like.

Upon receipt of the request for a collaboration conference, the network 102 routes the request to the CCRS 140, integrated within the network 102. However, it should be appreciated that the CCRS 140 may be a part of the network 102, may be separate from the network, or may have portions deployed in the network and out of the network. In addition, the CCRS 140 may be resident on one or more components of the VoIP network 140, including several instances of the CCRS 140 integrated throughout the network 140. Further, although only a single instance of a CCRS 140 is illustrated in FIG. 1, any number of CCRS instances may be present in the network 102 to form a CCRS system. As discussed in more detail below, the network 102 may account for the availability of multiple CCRS devices or instances through a process of establishing a master CCRS control engine.

To transmit the request to the network, the requester uses the communication device 110, 115, 120 to dial a conference specific telephone number. In some instances, the network, upon receipt of the dialed communication, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below.

In any event, the CCRS 140 receives the request to begin a collaboration conference or join an existing conference. In response, and described in more detail below, the CCRS 140 may route the one or more requests to one of several conference bridges 142, 144 associated with the Vol P network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the communications network 102 through which the communications of the conference are transmitted. This configuration is utilized for Internet Protocol (IP) based bridges.

Additionally, the CCRS 140 may be configured for use with any number of network and conference bridge platforms. For example, the telecommunications network 102 of FIG. 1 may be configured as a TDM network or an IP-based network, which includes video, audio and web-based components, to which the CCRS 140 may be configured to interface. Another particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based CCRS devices may utilize many of the advantages of information exchange within the header when communicating with TDM-based network devices.

To connect to a collaboration conference, each participant to the conference may be routed to the same conference bridge 142, 144 for the duration of the conference. The conference bridge 142, 144, in turn, provides communication ports for each participant such that each participant can hear or otherwise participate in the collaboration conference. Any conference bridge known in the art or hereafter developed may be integrated into the system 100 of FIG. 1 for hosting a collaboration conference. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

Figure 2:
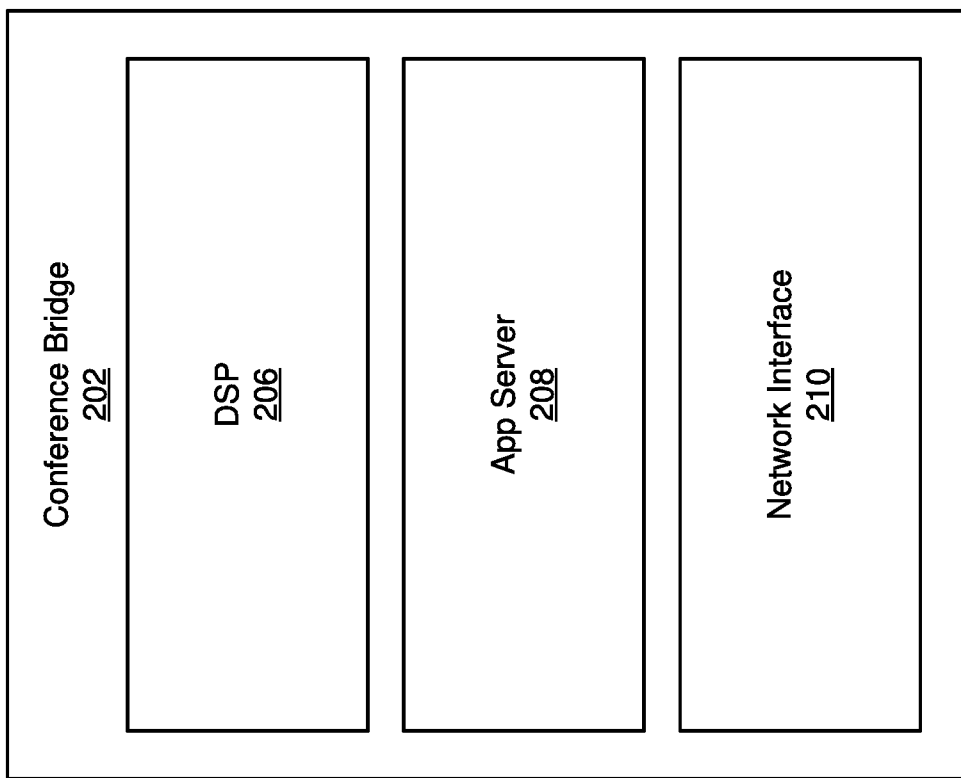
FIG. 2 is a block diagram illustrating a conference bridge configured to host one or more conferencing communications.

FIG. 2 is a block diagram illustrating an exemplary conference bridge device that may be utilized in the network configuration 100 of FIG. 1. The conference bridge 202 comprises an application server 208 and a digital signal processing (DSP) component 206. In general, the application server 208 of the conference bridge 204 communicates with one or more applications of the network to establish the collaboration conference. In addition, for SIP-based or other IP-based conference bridges, the bridge may include a network interface unit 210. In general, the application server 208 includes one or more applications that can be executed by the conference bridge 202 to perform many of the functions described herein for the conference bridge. In addition, the conference bridge 202 may include a network interface unit 210 for receiving information and/or instructions from the network 202 to route and connect a collaboration conference communication for that particular bridge. The network interface unit 210 connects to the media gateway 133 of FIG. 1 or connects directly to the core of the network 100 to receive the communications of the participants and connects each participant to each other to establish the collaboration conference. The network interface unit 210 may also initiate one or more of the applications stored in the application server for execution by the conference bridge. In general, the conference bridge 202 may receive a request from the network to connect a requester with a hosted conference. The request may be received through a signaling protocol, such as through a SIP-based communication. In response, the application server 208 may provision one or more ports for connection to the requester's communication. The app server 208 may then signal to the network 102 that the ports are available, at which point the data or audio portion of the communication may be routed to an available port in the conference bridge 202. In this manner, the handshaking between the network and the conference bridge 202 may occur over the signaling plane of the IP-based protocol separate from the data or audio portion of the communication request. A more detailed description of the method through which a request is routed to a conference bridge 202 is included below with reference to FIG. 3A.

Returning to FIG. 1, the network 100 may be utilized by one or more participants to a collaboration or conferencing communication hosted on a conference bridge 142, 144. In particular, FIG. 3A is a flowchart of a method for the CCRS of the network 102 to receive a request from one or more participants to join a collaboration session and route the participants to the proper conference bridge 142, 144 through which the collaboration is hosted. In general, the operations described in relation to the flowchart of FIG. 3A are performed by one or more components of the CCRS 140 as part of the telecommunications network 102.

Beginning with operation 302, a participant to a conference communication may dial into the conference using a telephonic device 110, 115 and/or 120. In particular, the participant may dial a conference number and/or enter a conference code to access the collaboration conference. The media gateway 130, 132 or other switching device routes the request from the participant to the CCRS 140 through the network 102. In FIG. 1, the request is illustrated by the dashed line between the media gateway 130, 132 and the CCRS 140. As should be appreciated, in some IP networks, the request may be routed to the CCRS 140 on a signaling plane and does not include the audio portion of the communication. The request is then received by the CCRS 140, as indicated by operation 302 of FIG. 3A.

Upon receipt, the CCRS 140 determines, in operation 304, which of the available conference bridges 142, 144 associated with the network 102 that is hosting or will host the collaboration conference requested by the participant. The CCRS 140 may utilize several factors to determine which conference bridge 142, 144 hosts the collaboration conference. Such factors and operations performed by the CCRS 140 to determine the appropriate conference bridge are discussed in more detail below. In addition, the CCRS 140 may communicate with one or more of the conference bridges 142, 144 associated with the network 102 in operation 304. This communication between the CCRS 140 and the conference bridges is illustrated by the dashed lines between the CCRS and the conference bridges in FIG. 1. Further, in the embodiment in which the conference bridge 142, 144 is within the network 100, the CCRS 140 would communicate directly with the conference bridge without going through the media gateway device 133.

In one embodiment, the CCRS 140 communicates particularly with the app server component 208 of the conference bridge 202 to determine the appropriate collaboration bridge and to establish the collaboration conference. The app server component 208 of the conference bridge 202 may provide any information concerning the conference bridge to the CCRS 140, including number and types of available ports, the technical capabilities of the conference bridge, current collaboration conferences being hosted by the conference bridge, and the like. In another example, the conference bridge 142 may be a SIP-based conference bridge. In this example, the CCRS 140 would communicate with the app server 208 through the network interface unit 210. The app server 208 then provisions the requested ports and notifies the CCRS 140 when such ports are available for the collaboration conference. In addition, the app server 208 provides the information of the conference bridge 142 that may be utilized by the CCRS 140 to determine which conference bridge will host the collaboration conference.

For example, a participant may utilize the telephonic device 120 or other communication device to access the network 100 and request access to a collaboration conference. The media gateway 130 associated with the communication device 120 routes the request to the CCRS 140. In response, the CCRS 140 identifies conference bridge B 144 as the conference bridge which will host or is hosting the collaboration conference. In one embodiment, the CCRS 140 communicates with conference bridge B 144 to determine availability and verify that the collaboration conference is hosted on conference bridge B.

In operation 306, the CCRS 140 requests an open communication port from the conference bridge 142 identified in operation 302. In the embodiment shown in FIG. 2, the conference bridge 202 may utilize a port in the DSP component 206 of the conference bridge in response to the request sent by the CCRS 140. The open port in the DSP component 206 allows the participant to connect to the collaboration conference hosted by the conference bridge 202 and participate in the conference. In addition, the conference bridge 202 may transmit an acknowledgement to the CCRS 140 from which the request originated to indicate that the requested communication is open. Again, in IP-based networks, the request for available ports and acknowledgement may occur on a separate communication signal than the audio or video portion of the collaboration communication. Further, a SIP-based network, the request may include certain information in the header of the request, such as the master ID number and/or the number of requested ports. The request made by the CCRS 140 to the conference bridge is illustrated in FIG. 1 as the dashed line from the CCRS to the media gateways associated with each conference bridge.

In operation 308, the CCRS 140 receives the acknowledgement message from the conference bridge 142. In one embodiment, the acknowledgement message contains information that identifies the open port to the CCRS 140. For example, in the SIP-based embodiment, the acknowledgment message may include the IP address of the conference bridge in the header of the message. In response to receiving the acknowledgement message, the CCRS 140 routes the participant's communication to the open port in the conferencing bridge 142 in operation 310. In one embodiment, the CCRS 140 facilitates the communication to the conference bridge 142 such that the audio portion of the communication from the participant is no longer routed through the CCRS. For example, in a network 102 that utilizes Session Initiation Protocol (SIP), the CCRS 140 may issue a "SIP Refer" command to the media gateway 133 in operation 310 to route the participant communication to the conference bridge 142, effectively removing the CCRS from the communication flow. This refer message may include the IP address of the selected conference bridge in the header such that the network can route the communication to the selected conference bridge. The connection of the communication bypassing the CCRS is illustrated in FIG. 1 as the solid line connecting the media gateway 133 associated with the participant's telephonic device 120 and the media gateway associated with conference bridge A 142. Thus, through the use of the method outlined in FIG. 3, the CCRS 140 may receive a request from a participant of a collaboration conference and route the participant to the proper conference bridge that hosts the specific collaboration conference. In a similar manner, collaboration conference participants may be routed to media gateway 133 and conference bridge A 142 such that multiple conferences may be occurring simultaneously through the network 102 on multiple conferencing bridges 142, 144.

As can be understood in light of the CCRS described above, utilizing a central conferencing server provides several advantages over previous conferencing systems. As mentioned, prior art conferencing systems statically connected each participant to a conferencing bridge based on the number assigned to the participant. Thus, such networks had no mechanism for adjusting the load on any one conferencing bridge based on the number of conference participants. In addition, such systems proved difficult in determining proper billing rates for the collaboration conference as each participant could be requesting access to the conference from any place on the globe, without any central mechanism for determining the location of each participant.

In contrast, the CCRS of the present disclosure provides flexibility in the routing and handling of the collaboration conferences. For example, because each participant request is directed to the CCRS, handling of the participant request is easier on the communications network as the termination point for each request is the same component of the network. In particular, by including a component of the network that is dedicated to handling all requests for a conference participation, other components in the network that were previously tasked with receiving and routing the request may be freed to handle other type of network traffic. In addition, the CCRS provides protection against unintended overloading of a conference bridge. For example, a very large company with several thousand employees may utilize the communication network for collaboration conferences. However, because collaboration conference numbers are typically directly associated to a dedicated conference bridge for that number, too many employees of a particular company attempting to initiate a collaboration conference at the same time may overload a conference bridge that is already hosting several other collaboration conferences. To prevent this, many communication networks may assign several conferencing access numbers to the very large company so that the employees are spread over several conference bridges. However, providing several conferencing access numbers to a single entity may be confusing to the employees of the very large company. In contrast, because the CCRS provides dynamic routing of the conference participants, a single conference access number may be provided to the very large company as the same conference access number may be routed to any one of the available conferencing bridges, rather than the dedicated conference bridge for the number. In this example, even if an inordinate number of employees attempt to initiate collaboration conferences at the same time, the CCRS can route the participants accordingly such that all of the collaboration conferences do not end up on the same conference bridge that may overload the bridge.

In another example, an administrator of a collaboration conference may prefer to include other types of multimedia communications to accompany the voice portion of the collaboration conference. For example, a web page may be provided to an administrator of the conference to provide presentations and/or control over the conference. The web moderator web page provides such control features as the ability to mute all participants, disconnect a particular individual participant, show the number and identification of each participant, and the like. However, such a web page may not be within the capabilities of each conference bridge. Thus, when such features are requested by a moderator of the collaboration conference, it is often advantageous to place the conference on a conference bridge that supports such features. Such routing of a conference to a conference bridge that supports the technical requirements of the collaboration conference can occur dynamically through the use of the CCRS described above. Further examples of dynamic routing advantages gained through the use of a CCRS in the telecommunications network are described below.

Also, a conferencing system that utilizes a CCRS can adapt to varying aspects of the collaboration conference. For example, the CCRS may identify that the participants to a particular collaboration conference are originating from a certain region of the world, based on the telephonic device the requester accesses the network. In this example, the CCRS can route each participant to a conference bridge that is geographically located near the region of the world of each participant to improve the reliability of the conference. Also, the CCRS may aid in the accurate billing of the conference to a customer by providing a central location in which information for each participant to a conference can be retained and retrieved by the telecommunications network. Such information may not be available to a conference bridge that just receives communications from the telecommunications network as the information may be spread over any number of devices in the network.

An additional advantage provided by the CCRS is a more robust and faster disaster recovery during failure of a conference bridge hosting a collaboration conference. In previous conferencing systems, such disaster recovery required a network administrator to reroute each participant to the conference to a new conference bridge, requiring both time and manpower to accomplish. In contrast, the CCRS as described herein may be programmed to identify a failure at a conference bridge and dynamically reroute each participant to a new conference bridge. This rerouting of the participants to a new conference bridge may occur with or without action by a network administrator such that disaster recovery occurs automatically. These advantages and more may be realized through the utilization of a CCRS in a conferencing system provided by a telecommunications network.

Figure 4:
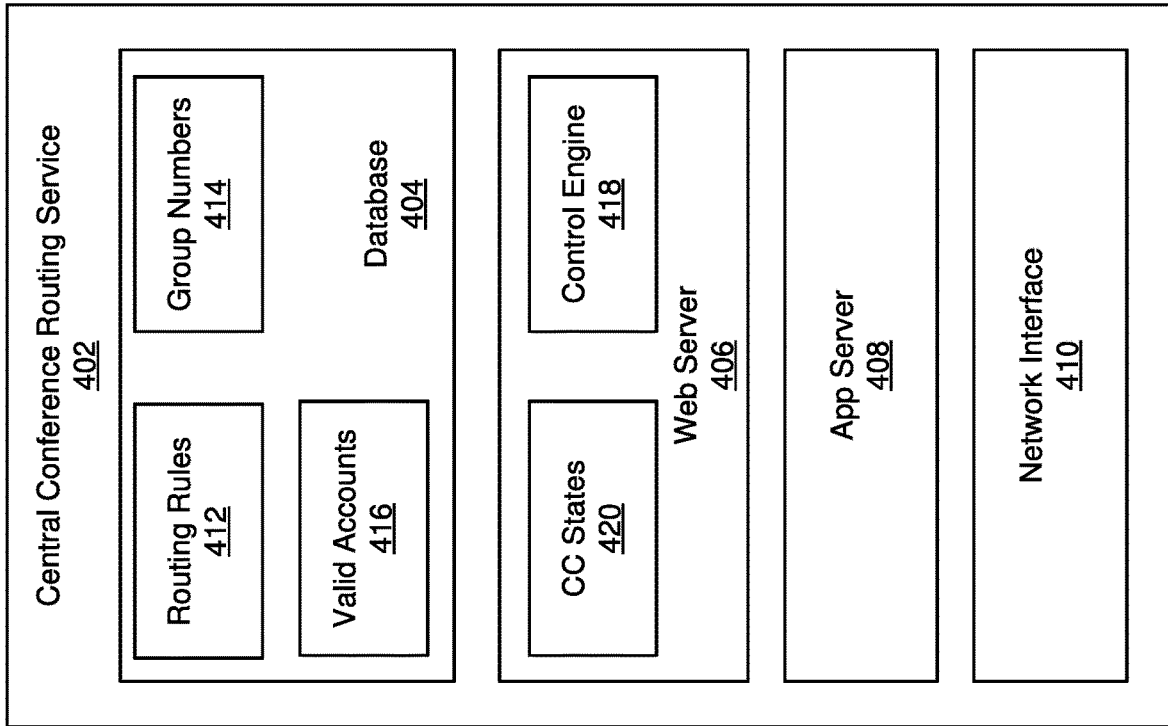
FIG. 4 is a block diagram illustrating several components of a central conferencing routing server.

FIG. 4 is a block diagram illustrating several components of a central conferencing routing server 140 that may be implemented on the network 100 of FIG. 1. The components outlined may be implemented by one or more processors executing one or more computer instructions stored in a computer-readable medium. Examples of systems that may execute or implement the components are provided below with reference to FIG. 5. Also, as mentioned above, the components of the CCRS may be located on any number of computing devices within the network, on any number of computing devices outside of the network, and/or a combination of both.

The CCRS 402 may include a database 404 configured to store information concerning an associated network, one or more customers or users of the network 416, identification numbers 414, and/or any other information useful by the CCRS in routing, billing, load balancing, disaster recover and the like for collaboration conferencing communications. For example, the database 404 may store identification numbers 414 for individuals or groups of users to the network who have access to a collaboration conference feature. Associated with the identification numbers may be one or more telephone numbers, access codes, communication device identifications, master identifications and routing rules associated with the users. The database 404 may also store information associated with the routing 412 and handling of collaboration conferencing, such as accepted communication devices, welcoming messages and operational rules for conducting the collaboration conference. In general, any information that may be utilized by the CCRS to route a collaboration communication and conduct the collaboration conference may be stored in one or more databases associated with the CCRS.

The CCRS also includes a web server 406 or web application that utilizes one or more applications stored in an application server 408 to execute the one or more applications. For example, the web server 406 may include one or more application programming interfaces (APIs) that execute any number of stored applications to perform the operations described herein. The web server 406 may also enable the provisioning of the databases 404 of the CCRS by the application server 408. In addition, the CCRS may include a network interface unit 410 as a proxy for receiving any type of information and/or instructions from the network 102 to route the communication. The network interface unit 410 may also initiate one or more of the applications stored in the application server or database for execution by the CCRS and/or receive a request from the telecommunications network to initiate a collaboration conference.

Through the use of the described components, the CCRS 402 provides added flexibility and features to collaboration conferencing not previously available. For example, because each collaboration conference request is routed through the CCRS or system of CCRS, routing rules may be applied to a block of related requesters identified by a master ID number or customer number, removing the need to update the routing rules for each member associated with the master ID or customer number. In addition, the database 404 of the CCRS 402 may maintain a control engine or state of a particular CCRS that determines which conference bridge a collaboration conference occurs. Thus, through the centralized nature of the CCRS 402 and the storage of customer and conference information, the CCRS provides flexibility in routing the collaboration conference requests.

Figure 3B:
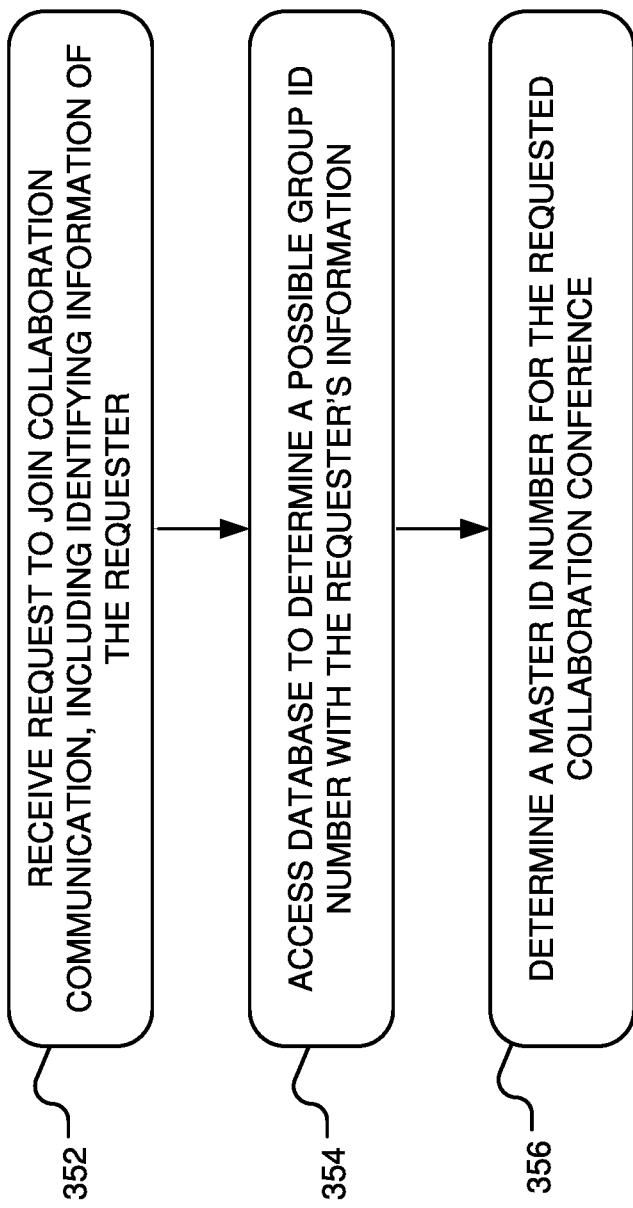
FIG. 3B is a flowchart illustrating a method for a central conferencing routing server to receive a request for a collaboration conference and associating a master identification number to the collaboration conference.

In operation, the CCRS 402 may perform the operations of the flowchart of FIG. 3B. In particular, the CCRS 402 receives a request to establish a collaboration conference at the network interface 410 in operation 352. The request may include information concerning the requestor, such as requestor's telephone number and access code number. However, although the operations of FIG. 3B are described in reference to the request comprising the requestor's telephone phone number and access code number, this is but one example of the information used by the CCRS to identify the requester. For example, the request may include an identification of the requester's communication device, such as a text string of the requester's personal computer. In another example, the requester's name may be used as the identifier of the requester in the request. Thus, any operation described herein utilizing the requester's telephone number and access code may be applied to other information contained in the request. For ease of instruction, however, the example of the telephone number and access code number is used.

Upon receiving the request, the application server 408, in concert with the web server 406, utilizes the requestor's telephone number and access code number to possibly determine a group ID number for the requester in operation 354. In particular, with the requester's information, the application server 408 accesses a lookup table stored in the database 404 to match the telephone number and code access number to the group ID number. In some instances, it is advantageous to associate a group ID number to a group of users of the collaboration conference system. For example, through the group ID, one or more routing rules may be applied to the entire group without the need to provide a routing rule for each individual member of the group. In some instances, the group ID number may be associated with a customer ID number such that each member associated with a customer ID number is given the same group ID number and alterations to the customer's account with the network can be applied to each group member through alterations to routing rules associated with the group ID number. Other information concerning the requester, the network and/or the collaboration conference may also be retrieved by the application server 408.

In operation 356, the application server 356 may also associate a master ID reference or number to the collaboration conference request and stores the master ID reference or number in the database 404. The master ID reference or number is utilized by the network to track the collaboration conference and the participants to the conference and may be associated with the requester's information. With the master ID number associated with the request, the application server 408 again accesses the database 404 to determine a state of the collaboration conference. In general, if the collaboration conference has been established on a conference bridge (such that the requester is a participant to the collaboration conference and not the initiator), the database 404 includes an identification of the conference bridge on which the collaboration conferencing is hosted. Alternatively, if the request is to initiate a new collaboration conference, the database includes a notification the request is a request for a new collaboration conference, at which point the application server routes the request to a master CCRS device that executes a master control engine application to determine which conference bridge will host the conference. In this manner, the components of the CCRS 402 receive the request to join or initiate a collaboration conference and route the request to the proper conference bridge.

As mentioned above, the database 402 may include a subscriber information table 414 that associates information of the requester (such as a telephone number, access code number or other identification or reference of a requestor) to a group ID number for the CCRS system. Thus, several different requester references can be associated with the same group ID number, such as a customer number. In addition, one or more routing rules 412 can be associated with a group ID number in the database 402. For example, one routing rule 412 may restrict all collaboration conferences for a particular group ID number to a particular conference bridge. This removes the need to manually change the routing rules for each individual requester for all of the members of a particular group ID number. Further, the database 404 of the CCRS 402 may be utilized by a control engine 418 of the CCRS system to store information 416 utilized by the control engine, such as associating a master ID number of a collaboration conference with an ID of the conference bridge on which the conference is hosted, the status of a collaboration conference 420, the start time of the collaboration conference, the participant count of the conference, the maximum number of participants that have attended the particular conference, and the like. In general, the database 404 may include any information concerning collaboration conferences hosted by the telecommunications network.

Figure 5:
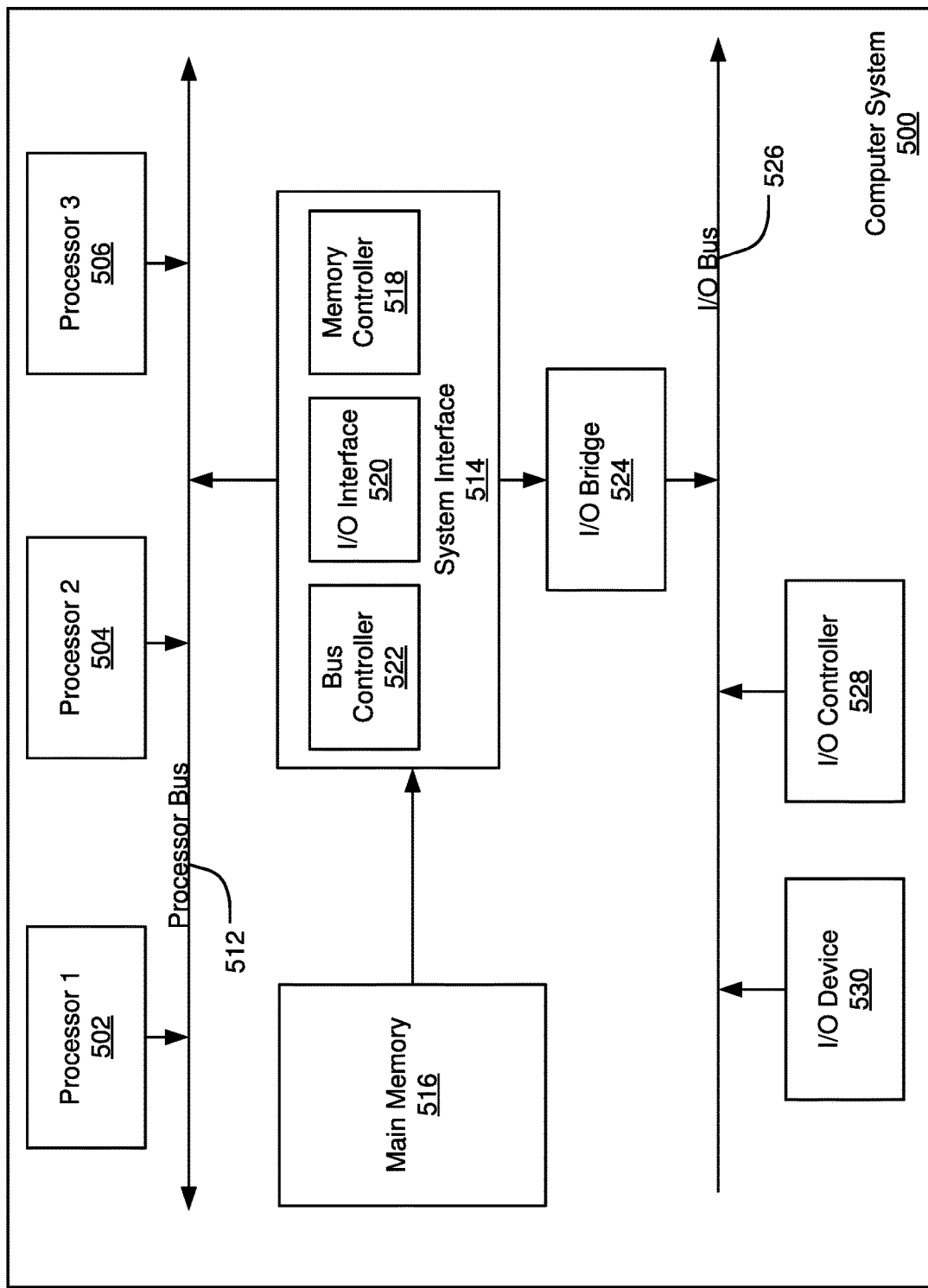
FIG. 5 is a diagram illustrating an example of a computing system which may be used in implementing embodiments of the present disclosure.

FIG. 5 is a block diagram illustrating an example of a computing device or computer system 500 which may be used in implementing embodiments of the present invention. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. Processors 502-506 may also be purpose built for processing/mixing media data, such as audio or video components of a media stream, such as a digital switch processor. System interface 514 may be connected to the processor bus 512 to interface other components of the system 500 with the processor bus 512. For example, system interface 514 may include a memory controller 515 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 550, as illustrated.

I/O device 550 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 6:
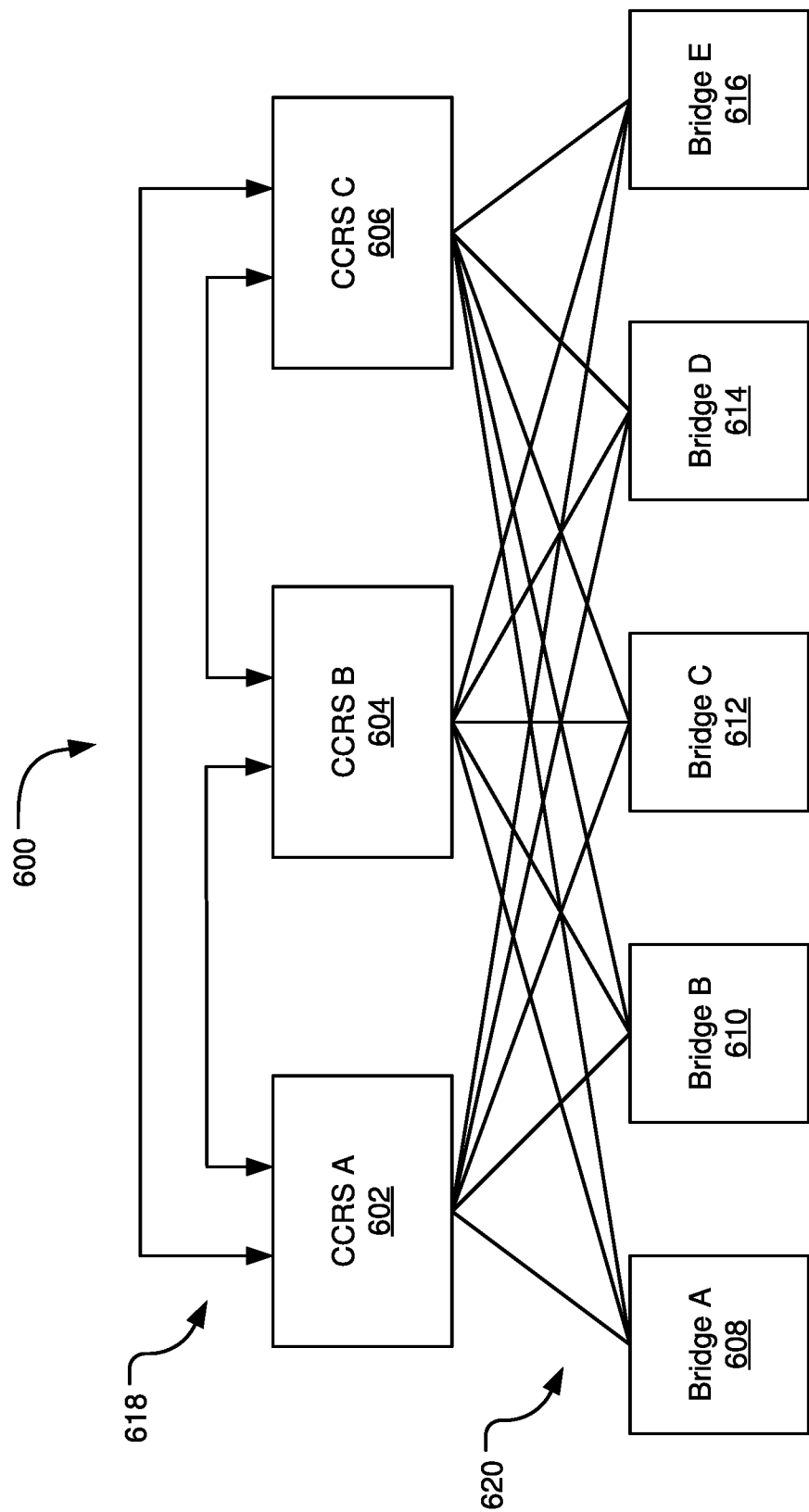
FIG. 6 is a block diagram of a plurality of central conferencing routing servers connected to a plurality of conference bridges over a telecommunications network.

As described, by utilizing one or more of the embodiments described above, the CCRS system may route a collaboration conference communication to an appropriate conference bridge based on any number of preferences or information about the requester and/or communication network. As also mentioned above, a telecommunications network may employ a plurality of CCRS in a telecommunications network that communicate and work in concert to route the collaboration conference communications. For example, FIG. 6 is a block diagram of a plurality of central conferencing routing servers connected to a plurality of conference bridges over a telecommunications network. The plurality of CCRS devices may take many forms. For example, the CCRS may be a plurality of application servers embodied on any number of telecommunication devices. In another example, the various components that comprise the plurality of CCRS in the network may be embodied on various such components. In general, the CCRS system 600 of a telecommunications network may include any number of CCRS 602-606 that operate in concert within a telecommunications network to provide the features and functionalities described herein.

The embodiment of the network 600 of FIG. 6 includes three CCRS 602-606. However, any number of CCRS may be present in the network to perform the operations described herein. Also, as mentioned above, the CCRS may be in different telecommunication devices, in the same telecommunication devices, or may be spread at a component level among several telecommunication devices. As used here, however, the CCRS 602-606 are discussed as being separate CCRS devices, although any of the above described embodiments of the CCRS system are contemplated to provide the various features of the CCRS system described herein.

In one embodiment, the CCRS may be located in different geographic locations, such that CCRS A 602 may be located in Denver, Colo., CCRS B 604 may be located in Minneapolis, Minn. and CCRS C 606 may be located in London, England, for example. In general, the CCRS 602-606 of the system 600 may be located in any geographic location the telecommunications network through which the CCRS operates is located. Further, each CCRS 602-606 of the system 600 may communicate with the other CCRS devices within the system, as shown in FIG. 6 through CCRS communication lines 618. Through these CCRS communication lines 618, the CCRS 602-606 can exchange information concerning the routing and handling of the collaboration conferences. The CCRS communication lines 618 may be included as a portion of or may be separate from the telecommunications network.

In addition, each CCRS 602-606 may be connected to any number of conference bridges 608-616. The conference bridges 608-616 are similar to the conference bridges described above with relation to FIGS. 1 and 2. In general, the conference bridges 608-616 host collaboration conferences. Although five such conference bridges are shown in FIG. 6, it is contemplated that any number of conference bridges 608-616 may be connected to the plurality of CCRS 602-606. Also, although the system 600 of FIG. 6 is configured such that each CCRS 602-606 is connected to each conference bridge 608-616 through CCRS-bridge communication lines 620, the system may be configured differently such that each CCRS is connected to any number of available conference bridges, including being connected to none of the available conference bridges. As should be appreciated, the CCRS-bridge communication lines 620 may occur over a telecommunications network as described in relation to FIG. 1 above.

As explained above with reference to FIGS. 3 and 3B, during operation the CCRS system receives a request to join or initiate a collaboration conference from a requestor. If a collaboration conference is in progress, the receiving CCRS can access its database to determine that the collaboration conference is in progress and route the request to join to the proper conference bridge that is hosting the collaboration conference. However, if the request is to establish a new collaboration conference, the CCRS system 600 can determine which conference bridge 608-616 to host to the conference. To avoid having the multiple CCRS devices determining where a particular collaboration conference is hosted, the CCRS system 600 may designate one CCRS as the master CCRS. In particular, the CCRS system 600 can designate a CCRS to execute a master control system program that is tasked by the system to determine a conference bridge 608-616 for all requests for new collaboration conferences. In one embodiment, any one of the CCRS 602-606 of the system 600 can be designated as the master control system or master CCRS. Thus, while each CCRS has the capability to operate as the master control engine for the system 600, only one CCRS executes the master control engine program at any one time. Through the master control engine program, any one of the CCRS devices 602-606 can route a request to join an existing collaboration conference once the conference is established, but only the master control engine (or master CCRS) determines the hosting conference bridge for a request for a new collaboration conference.

Figure 7:
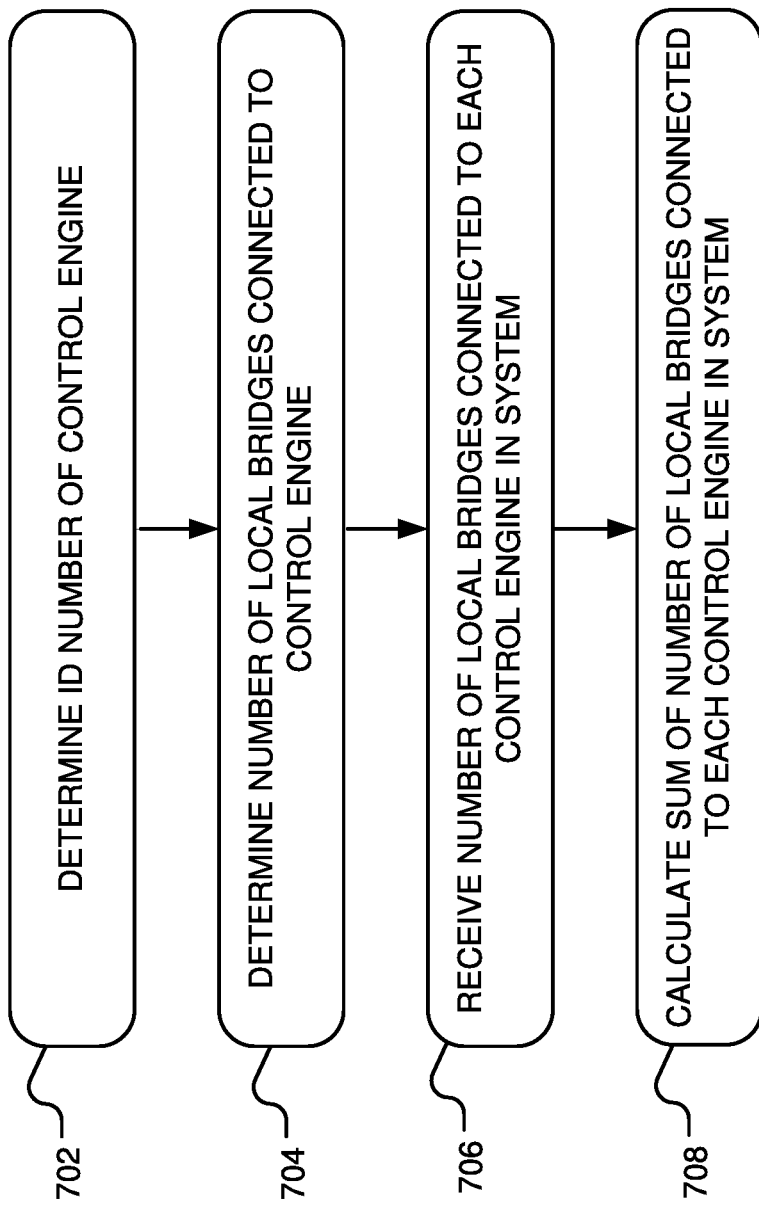
FIG. 7 is a flowchart of a method for a control engine of a central conferencing server to gather connection information for the telecommunications network.

To begin the process of determining which CCRS 602-606 of the system 600 is designated as the master control engine, each CCRS 602-606 may perform the operations of the flowchart of FIG. 7 to gather information about the system configuration. This gathered information may then be utilized by the system 600 to determine which CCRS 602-606 is the master CCRS tasked to determine the hosting conference bridge 608-616 for a particular request for a new collaboration conference.

Beginning in operation 702, each CCRS 602-606 determines the identifier or ID number associated with the CCRS. In general, the telecommunications network in which the CCRS system 600 is incorporated may assign an ID number or other identifier to each CCRS 602-606 in the system. In one example, the ID number is associated with the CCRS during provisioning of the CCRS device by a network administrator or technician, such as upon installation of the CCRS into the network. Further, the ID number may be associated with CCRS 602-606 in such a manner as to provide a preference to a particular CCRS or control engine of the CCRS that is designated as the master CCRS or master control engine. The manner through which the ID number is used to determine which CCRS 602-606 is tasked as the master control engine is discussed in more detail below with reference to FIG. 8.

Continuing to operation 704, each CCRS 602-606 of the system 600 determines the number of conference bridges 608-616 to which the particular CCRS is connected. For example, as shown in FIG. 6, CCRS A 602 is connected to and can communicate with each of conference bridge A 608 through conference bridge E 616. Such connections between a CCRS device and a conference bridge are referred to herein as the locally connected or local conference bridges to each CCRS. Thus, CCRS A 602 determines in operation 704 that it is locally connected to five conference bridges over communication lines 620. The same operation is performed by CCRS B 604 and CCRS C 606, each determining that they are also connected to five conference bridges. The number of determined local connections provides the system with a manner to determine which CCRS device communicates with the most number of conference bridges, making the master control engine designation the most effective.

Continuing to operations 706 and 708, each CCRS 602-606 also determines the total number of conference bridges 608-616 locally connected to all of the CCRS in the system 600. In particular, each CCRS 602-606 receives the number of locally connected conference bridges determined in operation 704. To receive this information, each CCRS 602-606 in the system 600 broadcasts their locally connected conference bridges to the other CCRS devices in the system 600. Thus, continuing the example above, CCRS A 602 broadcasts over communication lines 618 to CCRS B 604 and CCRS C 606 that CCRS A is connected to five conference bridges. Similarly, CCRS B 604 broadcasts to CCRS A 602 and CCRS C 606 that CCRS B is also connected to five conference bridges and CCRS C broadcasts to CCRS A and CCRS B that CCRS C is connected to five conference bridges. In operation 706, each CCRS receives these broadcasts and stores the information in the related database for use in operation 708.

With the information received in operation 706, each CCRS 602-606 calculates the total number of conference bridges 608-616 connected to all of the CCRS in the system 600 in operation 708. Thus, because each of the CCRS 602-606 in the example of FIG. 6 is connected to five conference bridges, each CCRS calculates the total number of locally connected bridges to be fifteen (15), as CCRS A 602 is connected to five conference bridges 608-616, CCRS B is also connected to five conference bridges and CCRS C is also connected to five conference bridges. This information is also stored in the database for use by the CCRS system 600.

Figure 8:
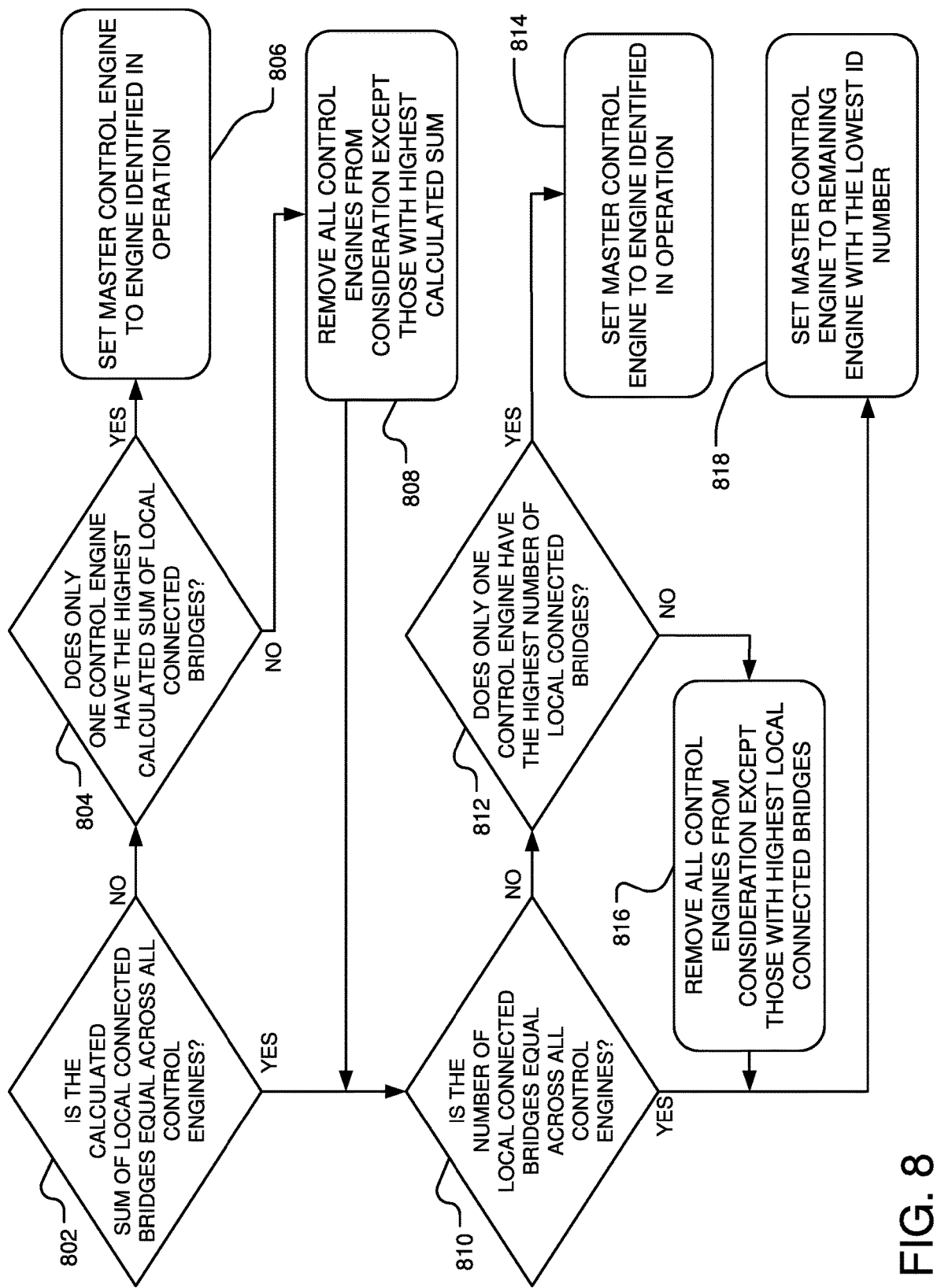
FIG. 8 is a flowchart of a method for a plurality of control engines of conferencing servers to establish a master control engine.

With the information obtained through the operations of FIG. 7, the CCRS system 600 can determine which CCRS is tasked as the master control engine through the method of the flowchart of FIG. 8. In particular, the telecommunications network or one or more components associated with or a part of the CCRS system 600 of FIG. 6 performs the operations of FIG. 8 to determine which CCRS is the master control engine for determining which conference bridge 608-616 of the system hosts a collaboration conference.

Figure 9A:
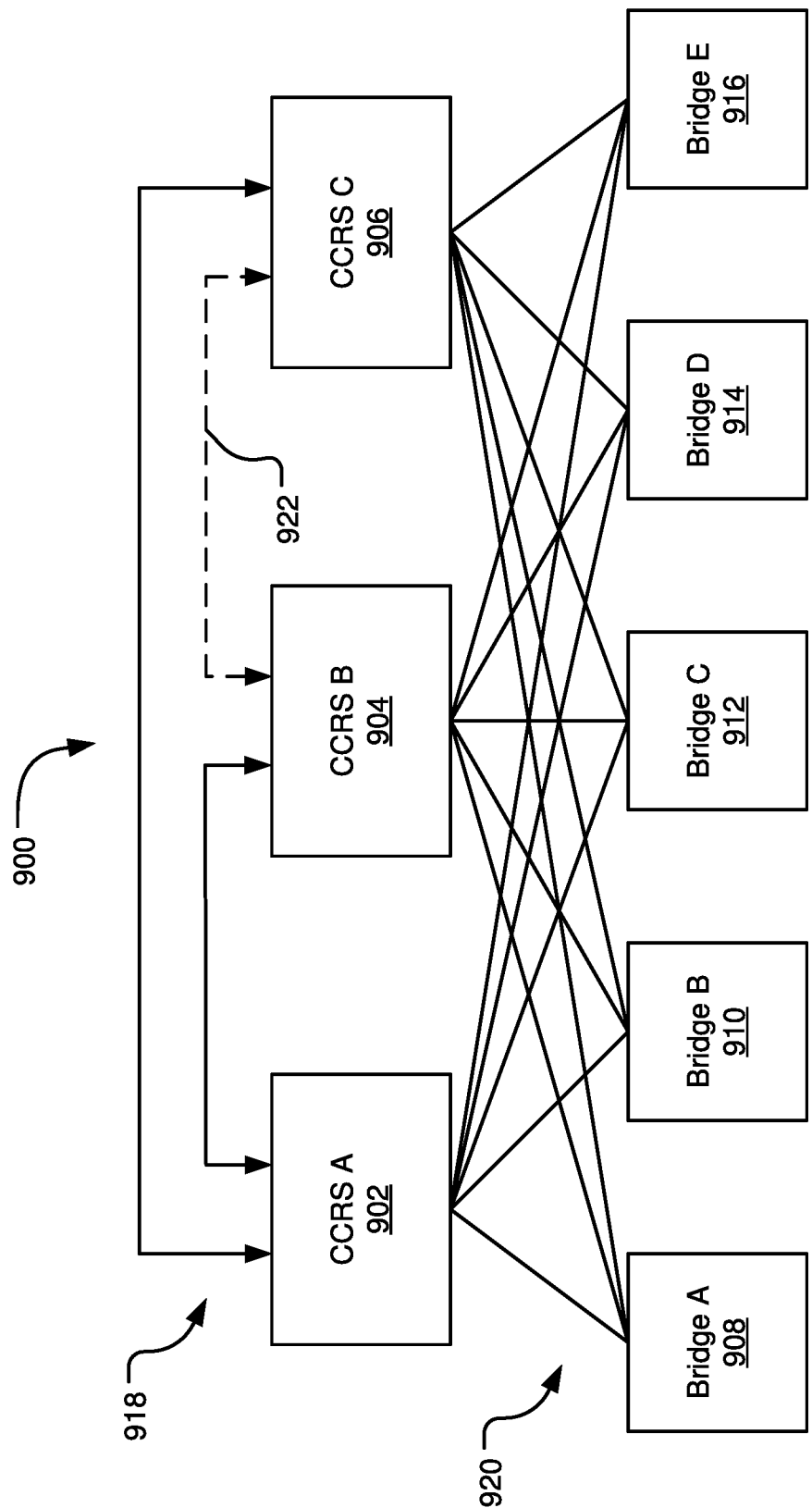
FIG. 9A is a block diagram of the network of FIG. 6 illustrating a faulty connection between two central conferencing routing servers.

Beginning in operation 802, the CCRS system determines if the calculated sum of local bridges across all of the CCRS of the system is equal as calculated by each CCRS. This number is determined in operation 708 of the flowchart of FIG. 7 discussed above. Thus, in the example given above, each of the CCRS in the system calculated a total number of 15 locally connected bridges for all of the CCRS in the system. Thus, in operation 802, the system would determine that the calculated sum of local bridges across all of the CCRS of the system is calculated equally by each of the CCRS. However, in some circumstances, at least one CCRS may calculate a different total number of locally connected bridges for each CCRS. For example, a CCRS system 900 is shown in FIG. 9A that is similar to the system of FIG. 6. However, in the example system 900 shown in FIG. 9A, CCRS communication line 922 is faulty or malfunctioning such that CCRS C 906 cannot communicate with CCRS B 904. Thus, in this example, CCRS B 904 would not have received the broadcast from CCRS C 906 of the number of locally connected conference bridges connected to CCRS C. Thus, CCRS B 904 calculates the total number of connected bridges as ten (five bridges connected to CCRS A and five bridges connected to CCRS B). However, CCRS A 902 would continue to calculate the total number of connected bridges as 15 as it receives the broadcast from each other CCRS device. Thus, in this example, not all of the CCRS would calculate the same total of connected bridges across all of the CCRS.

If the system determines that not all of the CCRS calculated the same total number of connected bridges, the system would then determine, in operation 804, if only one of the control engines of the CCRS has the highest calculated total of connected bridges. For example, due to communication problems between the CCRS devices in the system, more than one CCRS or control engine may calculate the largest total number of conference bridges connected to all of the CCRS devices in the system. This is the case illustrated in FIG. 9A where CCRS A 902 calculates 15 total bridge connections (five each from CCRS A, CCRS B 904 and CCRS C 906), while CCRS B calculates ten total bridge connections (five from CCRS A and five from CCRS B) and CCRS C similarly calculates ten total bridge connections (five from CCRS A and five from CCRS C). If only one CCRS calculates the highest number of total connected conference bridges, the system would select the CCRS that calculates the largest sum of connected bridges as seen by all CCRS devices as the master control engine to select which conference bridge hosts requests for a collaboration conference in operation 806.

Returning to operation 804, if the system determines that more than one control engine has calculated the highest sum of connected bridges, the system performs operation 808 and removes from consideration for master control engine status all control engines of CCRS except those that calculated the highest total number. For example, in a system including twenty conference bridges and three CCRS devices, several CCRS devices may calculate a total of sixty conference bridge connections, while others may calculate fewer than sixty if there is a faulty connection in the system. In this example, each of the CCRS devices that calculate the total number of connections of less than sixty is removed from consideration for master control engine status in operation 808. However, each CCRS that calculates the highest number would remain in consideration for master control engine status. Upon removal of those CCRS devices or control engines in operation 808, the system proceeds on to operation 810. Similarly, if the system determines in operation 802 that the calculated sum of connected bridges for all CCRS devices is equal, the system performs operation 808.

Operations 810-816 are similar to operations 802-808 described above. However, in these operations, the CCRS system analyzes the number of locally connected conference bridges to each CCRS device individually. Thus, in operation 810, the CCRS system determines if the number of locally connected conference bridge to each CCRS device is the same across all of the CCRS devices. In particular, referring once again to the example of FIG. 6, CCRS A 602 is connected to five conference bridges 608-616, CCRS B 604 is also connected to five conference bridges and CCRS C is connected to five conference bridges. Thus, in this example, each CCRS device 602-606 is connected to the same number of conference bridges through CCRS-bridge communication lines 620. As shown in the flowchart of FIG. 8, in such a case, the CCRS system would proceed to operation 818, described in more detail below.

Figure 9B:
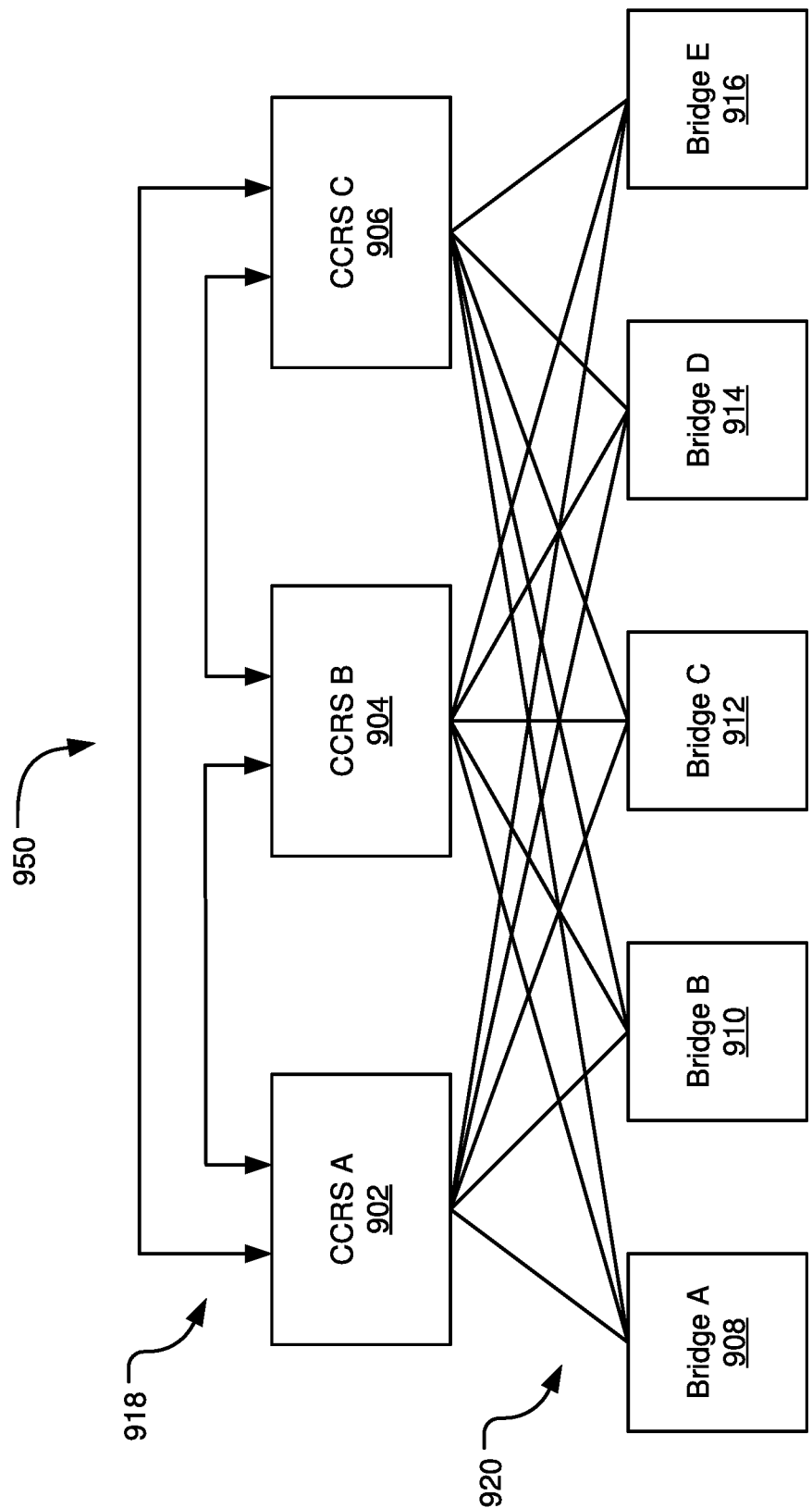
FIG. 9B is a block diagram of the network of FIG. 6 illustrating a faulty connection between a central conferencing routing server and a conference bridge.

Another example is illustrated in FIG. 9B, however. FIG. 9B is a CCRS system 950 that is similar to the system of FIG. 6. However, in the example system shown in FIG. 9B, communication line 924 between CCRS C 906 and conference bridge E 916 is faulty or malfunctioning such that CCRS C cannot communicate with conference bridge E. Thus, in this example, CCRS C 906 communicates only with conference bridges A-D 608-614. As a result, the number of locally connected conference bridges for CCRS C 906 is four, while both CCRS A 602 and CCRS B 604 are locally connected to five conference bridges. Thus, returning to operation 810 of FIG. 8, the CCRS system would determine that not all CCRS devices in the CCRS system have the same number of locally connected conference bridges in this example. In such cases, the CCRS system may then proceed to operation 812.

Similar to operation 804 described above, if the system determines that not all of the CCRS have the same number of locally connected bridges, the system would then determine in operation 812 if only one of the control engines of the CCRS has the highest number of locally connected bridges. For example, due to communication problems between the CCRS devices and the conference bridges, more than one CCRS or control engine may calculate a larger number of locally connected conference bridges connected to the CCRS devices in the system. This is the case illustrated in FIG. 9B where CCRS A 902 and CCRS B 904 are connected to five conference bridges (conference bridges A-E 608-616), while CCRS C is connected to four conference bridges (conference bridges A-D 608-614). However, if only one CCRS device has the highest number of locally connected conference bridges connected to it, the CCRS system sets the control engine associated with that CCRS as the master control engine in operation 814. The master control engine is then tasked with determining which conference bridge hosts collaboration conference requests.

Returning to operation 812, if the system determines that more than one control engine has the highest number of locally connected bridges, the system performs operation 816 and removes from consideration for master control engine status all control engines of CCRS except those that calculated the highest number of locally connected bridges. Thus, in the example of FIG. 9B, CCRS C 906 would be removed from consideration as the number of locally connected conference bridges is four and the number of locally connected bridges for CCRS A 902 and CCRS B 904 is five. Upon removal of those CCRS devices or control engines in operation 816, the system proceeds on to operation 818.

In operation 818, the CCRS system sets the master control engine as the remaining CCRS with the lowest ID number. As mentioned above, each CCRS in a CCRS system is assigned an ID number. Thus, in operation 818, the ID number is utilized by the system to select a control engine as the master control engine from the remaining CCRS. In another embodiment, the master control engine may be set as the control engine or CCRS with the highest ID number. In this manner, a selection hierarchy of the CCRS devices may be established through the ID numbers if each CCRS device includes the same number of connections to the conference bridges. The hierarchy of CCRS devices may be set through the ID numbers for any reasons related to the network. For example, the hierarchy may provide a preference to a master control engine that is geographically closer to the headquarters of the administrator of the telecommunications network. In another example, the hierarchy may provide a preference to a master control engine that is logically central to the telecommunications network to reduce transmission times through the network from the master CCRS. In general, the hierarchy may be established through the CCRS ID numbers for any reason related to the operation of the network.

In general and illustrated through the flowchart of FIG. 8, the master control engine is selected based on three criteria in a particular order: 1) the calculated sum of all connected bridges seen by all of the CCRS devices; 2) the number of locally connected conference bridges for each individual CCRS devices; and 3) the ID number associated with each CCRS device. The CCRS system uses the above criteria to determine the integrity of the connections within the system and, if all connections within the system are functioning properly, the master control engine is determined through the ID number. As should be appreciated, each CCRS includes a database that stores any information needed for the above determinations, as well as one or more applications to perform the selection of the master control engine or to perform the operations of the master control engine. In addition, one or more safeguards may be implemented in the CCRS system that prevents the master control engine from bouncing between two or more CCRS devices. For example, a delay may be incorporated that delays the switching of the master control engine from one CCRS to another to prevent frequent skipping of the master control engine status and allow the master control engine selection process be stable.

Once it is determined which of the CCRS devices is tasked as the master control engine, the CCRS system may begin routing requests for collaboration conferences to a connected conference bridge. In particular, CCRS system and/or the various components of a CCRS system may perform one or more of the operations illustrated in the flowchart of FIG. 10 to connect all requests to join an existing collaboration conference or initiate a new collaboration conference on a conference bridge.

Figure 10:
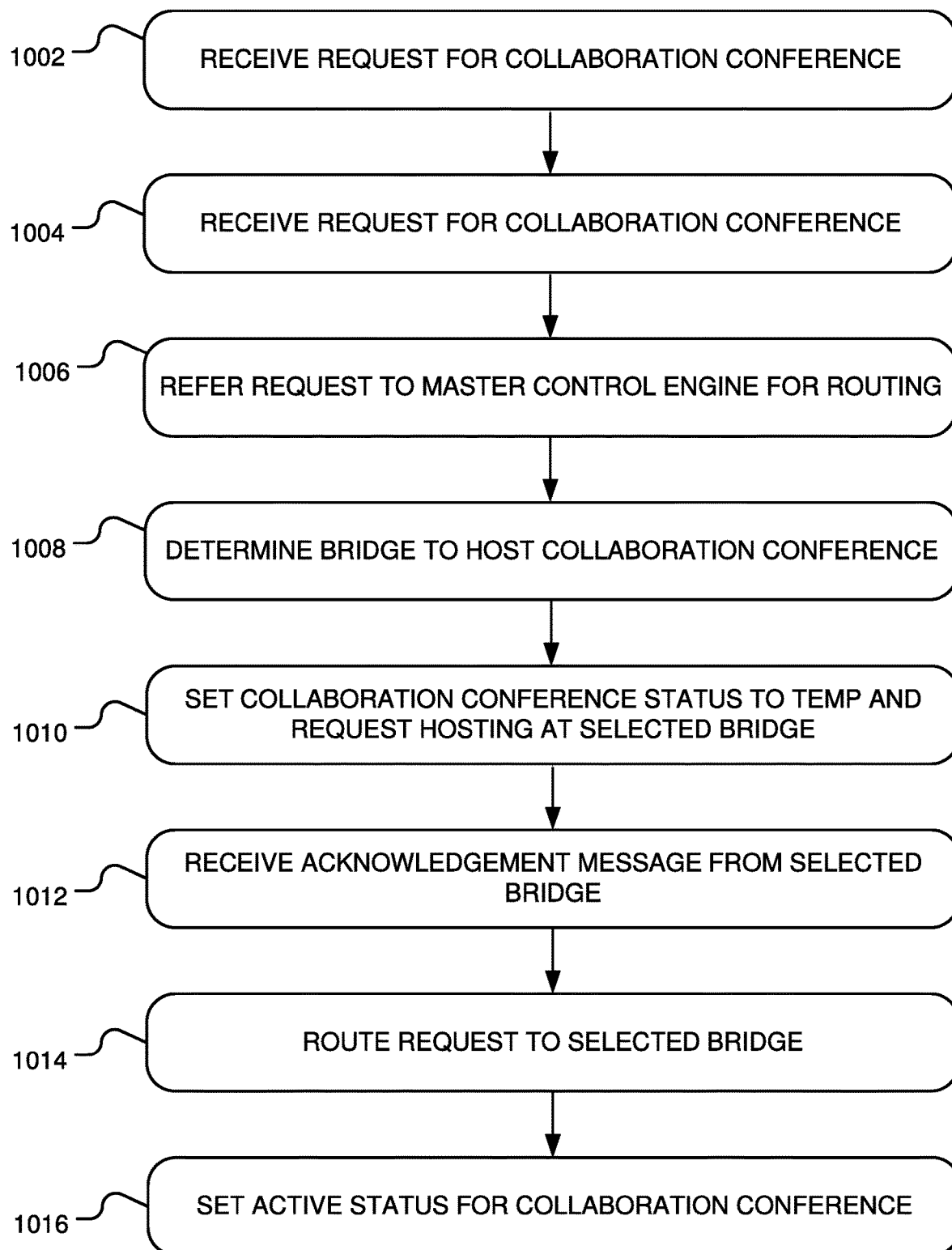
FIG. 10 is a flowchart of a method for a establishing a conferencing collaboration on a conference bridge.

The method of FIG. 10 begins in operation 1002 when a CCRS device of the CCRS system receives a request to join or initiate a collaboration conference from a requestor. In general, any CCRS device of the system may receive the request to join or initiate a collaboration conference from a requestor to the telecommunications network. Upon receipt, the CCRS may execute an application that checks the database of the CCRS to determine whether the requested conference is active in operation 1004. In addition to indicating that the collaboration conference is active, the database for the receiving CCRS may also indicate the particular conference bridge hosting the collaboration conference. In the case when a collaboration conference is active and the conference bridge is known, the receiving CCRS routes the request to join the collaboration conference to the appropriate conference bridge such that the requestor then joins the conference.

However, in some circumstances, such as when initiating a collaboration conference, the receiving CCRS checks the database and determines that the requested collaboration conference is not active. In this case, the CCRS then accesses the database to determine the identity of the CCRS device running the master control engine or otherwise acting as the master controller (which, in one embodiment, could be the same CCRS as the receiving CCRS) and, in operation 1006, routes the request to the master control engine for further processing.

In general, operations 1002 through 1006 are performed by the receiving CCRS, while operations 1008 through 1016 of FIG. 10 are performed by the CCRS running the master control engine. However, in some embodiments, the receiving CCRS and the master control engine CCRS are the same device such that one CCRS performs all of the operations of FIG. 10.

In operation 1008, the master control engine determines which bridge will host the requested collaboration conference. In general, the master control engine may use any information available or method to determine which bridge hosts a requested collaboration conference. For example, the master control engine may consult a priority table or list to determine which conference bridge will host the collaboration conference. The information or data within the priority table may be stored in the databases of the respective CCRS devices. In general, the priority list is associated to each account of the network, a customer number or other identifier of a requester, and the priority list identifies one or more conference bridges that may host a collaboration conference and a priority associated with each conference bridge. For example, the priority list for one customer may include three conference bridges ranked in order by the highest priority to the lower priority. In some embodiments, a plurality of conference bridges may be grouped into a single priority group. Upon receipt of a request for a collaboration conference, the master control engine may identify the requester, access the priority list associated with the requester and select a conference bridge based on the priority list. As discussed in more detail below, the priority of the conference bridges for any requester may be based on several criteria, including geographic location and technical features of the conference bridges. The operation of the load balancing and priority routing in relation to the CCRS is described in more detail in concurrently filed nonprovisional application Ser. No. 13.708,678 titled "LOAD BALANCING IN A CENTRAL CONFERENCING ROUTING SERVER," which is hereby incorporated by reference herein.

In one example of such criteria, one or more conference bridges may be assigned a higher priority based on the geographical location of the conference bridge. For various reasons, a conference bridge located in a particular area may be preferable for hosting a collaboration conference from a particular requester. For example, a conference bridge located nearer the requester may be preferable to one located a far distance. In this situation, the priority list for that requester may be updated or created to provide priority to the conference bridge near the requester such that, upon determining which conference bridge to host the collaboration conference, the control state engine may first consider the higher prioritized bridge.

Similarly, a higher priority may be given to a conference bridge that provides additionally requested features for the collaboration conference. For example, the requester may request the conference occur in wideband audio or other features that require an IP-based conference bridge. In this situation, an IP-based conference bridge may be given a higher priority than non-IP-based conference bridges in an attempt to meet the requests of the requester. Other priority criteria may be the size or other network requirements of the conference. For example, a requester may routinely request a high volume conference such that the CCRS may associate a conference bridge that handles larger conferences (conferences with more participants) a higher priority for that particular requester. In general, however, any information or criteria may be considered when the master control engine prepares the priority list associated with a requester.

Once the conference bridge is selected by the master control engine in operation 1008, the master control engine instructs an application server of the master CCRS to transmit a request to the selected conference bridge in operation 1010. In one embodiment described above, the application server routes the conference request to a conference bridge by requesting the conference bridge for an available port on the bridge. If the conference request is a request to establish a collaboration conference, the request may be for a plurality of available ports to host the conference. The allocation of available ports associated with the conference bridge may be handled by a request from the CCRS or by a control server associated with the conference bridge. In either case, available ports of the conference bridge may be made available in response to the conference request. In other embodiments, selection of a conference bridge may be accomplished using domain name system (DNS) resolution techniques, such as round-robin selection or intelligent algorithms that account for location and/or proximity considerations (e.g., Anycast), load on the bridges, popularity or any other known policy. Such techniques may either replace or supplement the routing protocols as part of the conference bridge selection process.

Also in operation 1010, the master control engine sets the status of the collaboration conference to a temporary or "temp" status. This state is stored in the database of the CCRS device that is tasked as the master control engine. In general, a collaboration conference can be designated as having several states, including "active", "temp", "ended" and "unknown". As discussed above, an "active" state indicates that the collaboration conference is established on a conference bridge. A "temp" state indicates that a request for a collaboration conference has been received by the master control engine and the master control engine is attempting to establish the collaboration conference on a conference bridge. An "ended" state indicates that a collaboration conference has ended, but provides a small window of time to allow the conferencing system to completing the conference session. An "unknown" status is set when a collaboration conference is interrupted by a failure at the conference bridge. Although only four states are discussed herein, it should be appreciated that any number of states may be applied to a collaboration conference to aid the CCRS system in maintaining and tracking the various collaboration conferences performed through the network.

As mentioned, the master control engine sets the state of the requested collaboration conference to a "temp" state in operation 1010. While the collaboration conference is in the temp state, any additional requests to join and the original request to initiate the particular collaboration conference are held until an acknowledgement from the selected conference bridge is received. Thus, in operation 1012, the master CCRS receives an acknowledgement message from the selected conference bridge that the requested ports are available indicating that the requested ports for hosting a collaboration conference are available on the selected conference bridge.

In response, the application server of the master CCRS routes the request for the collaboration conference to the selected bridge in operation 1014. In addition, the application server can route any additional requests that may have arrived at the master control engine CCRS device while the collaboration conference was in a "temp" state. Also, in operation 1016, the master control engine sets the state of the collaboration conference to "active". This active status may also be provided to the other CCRS devices in the CCRS system so that those CCRS devices become aware of the active conference. In one embodiment, the CCRS devices receive the active status of any collaboration conference through the connection to the conference bridge hosting the conference. In another embodiment, the active status and the hosting conference bridge of the collaboration conference may be broadcast to the other CCRS devices in the CCRS system for storage in each CCRS database. Thus, when additional requests are made to join the collaboration conference, the receiving CCRS does not need to refer the request to the master control engine for routing. Rather, the receiving CCRS can check the database and determine that the requested collaboration conference is active and on which conference bridge the conference is hosted. This also relieves the master control engine to route other collaboration conferencing initialization requests.

Another advantage that the CCRS system provides includes the situation when a conference bridge is placed offline or suffers a failure. For example, a scheduled maintenance on one of the conference bridges may be desired by a network administrator. Thus, conferences currently being hosted on the conference bridge for repair may be maintained by the conference bridge until completion, but new conferences may be directed to other conference bridges in an effort to remove the conferences from the selected conference bridge. To accomplish this, the CCRS may remove the failing or scheduled-for-repair conference bridge from the priority lists for each requester. Thus, when a request is received to begin a new collaboration conference and the CCRS consults the priority list for the requester, the failing or scheduled-for-repair bridge is not an available option. However, the CCRS devices may continue to direct requests for ongoing conferences to the proper conference bridge as the state of the collaboration conference remains active until termination of the conference. The operation of disaster recovery in relation to the CCRS is described in more detail in concurrently filed nonprovisional application Ser. No. 13/708,689 titled "DISASTER RECOVERY WITH A CENTRAL CONFERENCING ROUTING SERVER," which are hereby incorporated by reference herein.

The CCRS may perform a similar operation when a conference bridge enters a failure state. In this situation, the failed bridge may be removed from the priority list for each requester. In addition, all requests received by the CCRS to join an existing conference may be sent to another conference bridge. However, this may create a situation where a conference is split between two conference bridges. In this situation, the CCRS may generate a notice to a network administrator of the potential for a split conference so that the administrator may direct each participant of the split conference to a single, operating conference bridge. In some embodiments, the recovery of a split conference into a united conference may be performed automatically by the CCRS upon detection. In addition, upon bringing the failed bridge back online, the CCRS may throttle the conferences placed on the bridge to prevent an overload of the bridge.

The CCRS includes other features that may aid the network in transmitting collaboration conferences. For example, one embodiment of the CCRS may route an internet or web connection that is associated with the collaboration conference to the same conference bridge that hosts the conference to maintain continuity between the related web application and the conference. Another example may include a conference lingering feature that maintains the status of each conference in the state engines for a specified amount of time to allow any changes or alterations to the requesters account to propagate to each conference bridge and state engine associated with the CCRS. Additionally, the CCRS may be configured to collect information about the conferences and store this information for analyze or use by the network and/or administrators of the network. For example, information on the number of participants associated with any conference may be maintained for future analysis to differentiate large conference users for future routing decisions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A system for designating a master conferencing routing server from a plurality of collaboration routing servers in a telecommunications system, the system comprising:
   at least one processor;
   memory, operatively connected to the at least one processor and storing instructions that, when executed by the at least one processor, cause the system to perform a method, the method comprising:
      receiving a first total number of conference bridges to which a first collaboration conferencing routing server of the plurality of collaboration conferencing routing servers is locally connected;
      receiving a second total number of conference bridges to which a second collaboration conferencing routing server of the plurality of collaboration conferencing routing servers is locally connected;
      designating the master conferencing routing server from the plurality of collaboration routing servers based on the highest of the first total and the second total; and
      receiving a collaboration conference access request from a requester's communication; and
      selecting a hosting conference bridge from a plurality of conference bridges connected to the designated master conferencing routing server, wherein the hosting conference bridge is configured to host a collaboration conference.

2. The system as recited in claim 1, wherein the method further comprises:
   transmitting one or more routing messages to the telecommunications network, wherein the one or more routing messages include an indication of the selected conference bridge.

3. The system as recited in claim 2, wherein the selecting comprises:
   accessing a priority list of the plurality of conference bridges, the priority list configured to list the plurality of conference bridges in an order of preference based on the identification number.

4. The system as recited in claim 1, wherein the method further comprises:
   associating an identification number with the collaboration conference access request, the identification number associated with a customer of a telecommunications network.

5. The system as recited in claim 1, wherein the method further comprises:
   requesting operational information of the plurality of conference bridges, the operational information comprising at least an available capacity for the plurality of conference bridges.

6. The system as recited in claim 1, wherein the operational information of the plurality of conference bridges further comprises at least one technical feature, and wherein the method further comprises:
   analyzing the at least one technical feature of the plurality of conference bridges.

7. The system as recited in claim 1 wherein at least one conference bridge of the plurality of conference bridges is a session initiation protocol (SIP) based telecommunication device.

8. The system as recited in claim 7, wherein the method further comprises receiving an acknowledgement message from the selected hosting conference bridge that comprises at least an IP address of the selected conference bridge.

9. A nontransitory computer readable medium storing instructions that, when executed by at least one processor, cause the at least one processor to perform a method for designating a master conferencing routing server from a plurality of collaboration routing servers in a telecommunications system, the method comprising:
   receiving a first total number of conference bridges to which a first collaboration conferencing routing server of the plurality of collaboration conferencing routing servers is locally connected;
   receiving a second total number of conference bridges to which a second collaboration conferencing routing server of the plurality of collaboration conferencing routing servers is locally connected;
   designating the master conferencing routing server from the plurality of collaboration routing servers based on the highest of the first total and the second total; and
   receiving a collaboration conference access request from a requester's communication; and
   selecting a hosting conference bridge from a plurality of conference bridges connected to the designated master conferencing routing server, wherein the hosting conference bridge is configured to host a collaboration conference.

10. The nontransitory computer readable medium as recited in claim 9, wherein the method further comprises:
   transmitting one or more routing messages to the telecommunications network, wherein the one or more routing messages include an indication of the selected conference bridge.

11. The nontransitory computer readable medium as recited in claim 10, wherein the selecting comprises:
   accessing a priority list of the plurality of conference bridges, the priority list configured to list the plurality of conference bridges in an order of preference based on the identification number.

12. The nontransitory computer readable medium as recited in claim 9, wherein the method further comprises:
   associating an identification number with the collaboration conference access request, the identification number associated with a customer of a telecommunications network.

13. The nontransitory computer readable medium as recited in claim 9, wherein the method further comprises:
   requesting operational information of the plurality of conference bridges, the operational information comprising at least an available capacity for the plurality of conference bridges.

14. The nontransitory computer readable medium as recited in claim 9, wherein the operational information of the plurality of conference bridges further comprises at least one technical feature, and wherein the method further comprises:
   analyzing the at least one technical feature of the plurality of conference bridges.

15. The nontransitory computer readable medium as recited in claim 9 wherein at least one conference bridge of the plurality of conference bridges is a session initiation protocol (SIP) based telecommunication device.

16. The nontransitory computer readable medium as recited in claim 15, wherein the method further comprises receiving an acknowledgement message from the selected hosting conference bridge that comprises at least an IP address of the selected conference bridge.

\* \* \* \* \*